(12) United States Patent
Jung et al.

(10) Patent No.: US 9,516,718 B2
(45) Date of Patent: Dec. 6, 2016

(54) LED LUMINESCENCE APPARATUS

(71) Applicant: Seoul Semiconductor Co., Ltd., Ansan-si (KR)

(72) Inventors: Hye Man Jung, Ansan-si (KR); Hyun Gu Kang, Ansan-si (KR); Snag Wook Han, Ansan-si (KR); Young Do Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/370,021

(22) PCT Filed: Dec. 28, 2012

(86) PCT No.: PCT/KR2012/011810
§ 371 (c)(1),
(2) Date: Jun. 30, 2014

(87) PCT Pub. No.: WO2013/100736
PCT Pub. Date: Jul. 4, 2013

(65) Prior Publication Data
US 2015/0296582 A1 Oct. 15, 2015

(30) Foreign Application Priority Data

Dec. 29, 2011 (KR) .................. 10-2011-0146391
Dec. 29, 2011 (KR) .................. 10-2011-0146392
Dec. 29, 2011 (KR) .................. 10-2011-0146461

(51) Int. Cl.
*H05B 37/00* (2006.01)
*H05B 33/08* (2006.01)

(52) U.S. Cl.
CPC ........ *H05B 33/0845* (2013.01); *H05B 33/089* (2013.01); *H05B 33/0809* (2013.01);
(Continued)

(58) Field of Classification Search
CPC .. H05B 33/0845; H05B 33/089; H05B 37/036
(Continued)

(56) References Cited

U.S. PATENT DOCUMENTS 6,847,169 B2 *  1/2005  Ito .................. H05B 33/0815
                                                        315/77
7,081,722 B1 *  7/2006  Huynh ............. H05B 33/0818
                                                       315/185 S
(Continued)

FOREIGN PATENT DOCUMENTS

CN         1816233           8/2006
CN         1843061          10/2006
(Continued)

OTHER PUBLICATIONS

The First Office Action dated May 5, 2015, in Chinese Patent Application No. 201280070780.6.
(Continued)

*Primary Examiner* — Jason M Crawford
(74) *Attorney, Agent, or Firm* — H.C. Park & Associates, PLC

(57) ABSTRACT

An LED luminescence apparatus is provided, which includes a rectifying unit rectifying an AC voltage and generating a rectified voltage; a plurality of LEDs connected in series to an output terminal of the rectifying unit; a plurality of switches having drain terminals connected to cathodes of the plurality of LEDs, respectively; and a switch control unit sensing current through a plurality of resistors connected to source terminals of the plurality of switches, respectively, comparing the sensed current with a set reference current, and outputting a voltage corresponding to a difference between the sensed current and the set reference current to a gate terminal of each of the plurality of switches.

37 Claims, 15 Drawing Sheets

(52) U.S. Cl.
CPC ..... *H05B 33/0812* (2013.01); *H05B 33/0824* (2013.01); *H05B 33/0827* (2013.01)

(58) Field of Classification Search
USPC .................. 315/185 R, 291, 294, 297, 307
See application file for complete search history.

(56) References Cited

U.S. PATENT DOCUMENTS

| | | | |
|---|---|---|---|
| 7,564,198 B2 | 7/2009 | Yamamoto et al. | |
| 8,044,609 B2 | 10/2011 | Liu | |
| 8,421,365 B2* | 4/2013 | Kong | H05B 33/0818 315/209 R |
| 8,427,073 B2 | 4/2013 | Kung et al. | |
| 8,441,196 B2* | 5/2013 | Liu | H05B 33/086 315/185 R |
| 8,471,499 B2* | 6/2013 | Um | H05B 33/0827 315/193 |
| 8,476,836 B2* | 7/2013 | van de Ven | H05B 33/0818 315/185 R |
| 2007/0013321 A1 | 1/2007 | Ito et al. | |
| 2009/0189539 A1* | 7/2009 | Deng | H05B 33/0812 315/294 |
| 2010/0072903 A1* | 3/2010 | Blaut | H05B 33/0863 315/185 R |
| 2010/0090604 A1 | 4/2010 | Maruyama et al. | |
| 2010/0164403 A1* | 7/2010 | Liu | H05B 33/086 315/297 |
| 2010/0194298 A1* | 8/2010 | Kuwabara | H05B 33/083 315/186 |
| 2010/0194299 A1* | 8/2010 | Ye | H05B 33/0827 315/192 |
| 2010/0220049 A1* | 9/2010 | Murakami | H05B 33/0815 345/102 |
| 2010/0237786 A1* | 9/2010 | Santo | G09G 3/342 315/185 R |
| 2010/0308739 A1 | 12/2010 | Shteynberg et al. | |
| 2011/0084619 A1* | 4/2011 | Gray | H05B 33/0824 315/185 R |
| 2011/0140616 A1 | 6/2011 | Yan et al. | |
| 2011/0163682 A1* | 7/2011 | Jungwirth | H05B 33/0818 315/192 |
| 2011/0273103 A1* | 11/2011 | Hong | H05B 33/0821 315/193 |

FOREIGN PATENT DOCUMENTS

| | | |
|---|---|---|
| CN | 101137261 | 3/2008 |
| CN | 101772237 | 7/2010 |
| CN | 101902855 | 12/2010 |
| CN | 102235608 | 11/2011 |
| JP | 2006-244848 | 9/2006 |
| JP | 2010-109168 | 5/2010 |
| JP | 2011-146263 | 7/2011 |
| JP | 2011-238605 | 11/2011 |
| KR | 10-2010-0067468 | 6/2010 |
| KR | 10-2011-0007706 | 1/2011 |
| WO | 2005115058 | 12/2005 |
| WO | 2010-141684 | 12/2010 |

OTHER PUBLICATIONS

International Search Report dated Apr. 22, 2013 in International Patent Application No. PCT/KR2012/011810.
Extended European Search Report dated Jan. 8, 2016, in European Patent Application No. 12863965.5.
Office Action dated Jan. 29, 2016, in Chinese Patent Application No. 201280070780.6.

* cited by examiner

LED LUMINESCENCE APPARATUS

CROSS-REFERENCE TO RELATED APPLICATIONS

This application is the National Stage of International Application No. PCT/KR2012/011810, filed on Dec. 28, 2012, and claims priority from and the benefit of Korean Patent Application No. 10-2011-0146461, filed on Dec. 29, 2011, Korean Patent Application No. 10-2011-0146391, filed on Dec. 29, 2011, and Korean Patent Application No. 10-2011-0146392, filed on Dec. 29, 2011, each of which is hereby incorporated by reference for all purposes as if fully set forth herein.

BACKGROUND

Field

The present invention relates to an LED luminescence apparatus, and more particularly, to an LED luminescence apparatus which drives a plurality of LEDs in multistage using AC power in order to improve a power factor and a total harmonics distortion (THD) ratio, controls a current rising period and a current falling period of switches for use in multistage driving by varying the gate terminal voltages of the switches, controls current flowing to LEDs in consideration of variable characteristics of AC power, or drives the LEDs using voltage output from a phase control type dimmer.

Discussion of the Background

An LED (Light Emitting Diode) luminescence apparatus in the related art, which uses AC power, provides a unipolar ripple voltage which is output from a rectifying circuit that is implemented by a bridge circuit to high-voltage LEDs through resistors.

In the LED luminescence apparatus in the related art using AC power, LEDs emit light in a time period during which the AC voltage is higher than a forward voltage Vf of the LEDs, and current flows to the LEDs in a time period during which the LEDs emit light. Due to this, a phase difference occurs between the AC voltage (LED driving voltage) that is applied to the LEDs and the LED driving current, and thus the electrical characteristics of the LED luminescence apparatus using AC power, such as power factor and total harmonics distortion, may not satisfy the standards that are required in LED luminescence.

Further, a commercial AC power supply is unable to provide an AC voltage of an ideal sinusoidal waveform. That is, the commercial AC voltage has the problem that the level of the commercial AC voltage is higher or lower than a reference voltage of the ideal sinusoidal waveform, and due to such harmonic waves, the LED driving voltage has a waveform that is distorted from the sinusoidal waveform. Since the waveform of the LED driving voltage is distorted, the waveform of the LED driving current also becomes distorted.

According to the LED luminescence apparatus in the related art, since the waveform of the LED driving current is distorted, very large deviations occur in the luminescence efficiency of the LEDs.

On the other hand, a dimming function of a typical luminescence apparatus is a function that is used to control the brightness of the luminescence apparatus according to user's preference, and the adaptation of the dimming function has conventionally been greatly limited. At the present time, however, due to the increase of the use amount of electric energy, energy saving has become one of the most important issues. Accordingly, the dimming function of the luminescence apparatus, which was once an optional function simply for user's preference, has been highlighted as an essential function for saving electric energy.

The luminescence apparatus using AC power performs the dimming function by adjusting the effective voltage Vrms of the AC power through control of an AC phase of the AC power by using semiconductor elements such as triacs.

The luminescence apparatus in the related art, such as an incandescent light bulb and a halogen lamp, may have very low impedance since the characteristic of the equivalent circuit thereof is equal to that of a resistor circuit. The electrical characteristics of such an incandescent light bulb and a halogen lamp are suitable to the load characteristics that are required in the phase control type dimmer (dimmer using triac switches), and the brightness of the incandescent light bulb and the halogen lamp can be easily controlled by the voltage output from the dimmer.

However, the LED luminescence apparatus has various types of impedance depending on the level of the applied voltage due to the IN characteristics of the LEDs. Further, if the level of the input voltage of the LEDs is lower than the forward voltage Vf of the LEDs, current hardly ever flows, and thus the LED luminescence apparatus has very high impedance. Because of this, the LED luminescence apparatus has the problem that it is not easy to control the brightness of the LED luminescence apparatus by the voltage output from the phase control type dimmer.

SUMMARY

The present invention has been made to solve the above-mentioned problems occurring in the related art, and an object of the present invention is to provide an LED luminescence apparatus, which drives a plurality of LEDs in multistage using AC power in order to improve an LED luminescence efficiency, a power factor, and a total harmonics distortion (THD) ratio, and to control a current rising period and a current falling period of switches for use in multistage driving by varying gate terminal voltages of the switches.

Another object of the present invention is to provide an LED luminescence apparatus, which drives a plurality of LEDs in multistage using AC power in order to improve an LED luminescence efficiency, a power factor, and a total harmonics distortion (THD) ratio, and controls current flowing to LEDs in consideration of variable characteristics of the AC power.

Still another object of the present invention is to provide an LED luminescence apparatus, which drives a plurality of LEDs in multistage using AC power in order to improve an LED luminescence efficiency, a power factor, and a total harmonics distortion (THD) ratio, and controls constant current to flow to LEDs using voltages output from a phase control type dimmer.

In order to achieve the above objects, according to an aspect of the present invention, there is provided an LED luminescence apparatus, which includes a rectifying unit rectifying an AC voltage and generating a rectified voltage; a plurality of LEDs connected in series to an output terminal of the rectifying unit; a plurality of switches having drain terminals connected to cathodes of the plurality of LEDs, respectively; and a switch control unit sensing current through a plurality of resistors connected to source terminals of the plurality of switches, respectively, comparing the sensed current with a set reference current, and outputting a voltage corresponding to a difference between the sensed current and the set reference current to a gate terminal of each of the plurality of switches.

According to the aspect of the present invention, the plurality of resistors may be connected in series with each other, one terminal of a first resistor among the plurality of resistors may be connected to a source terminal of a first switch among the plurality of switches, and the other terminal of the first resistor may be connected to a source terminal of a second switch among the plurality of switches and a connection terminal of a second resistor among the plurality of resistors, and one terminal of a last resistor among the plurality of resistors may be connected to a source terminal of a last switch among the plurality of switches, and the other terminal of the last resistor may be connected to a ground terminal.

According to the aspect of the present invention, the plurality of resistors may be connected in parallel with each other, one terminal of each of the plurality of resistors may be connected to each of the source terminals of the plurality of switches, and the other terminal of each of the plurality of resistors may be connected to a ground terminal.

According to the aspect of the present invention, as a value of each of the plurality of resistors is changed, a level of the current sensed at one terminal of each of the plurality of resistors may be changed.

According to the aspect of the present invention, each of the plurality of switches may be turned off if the voltage input from the switch control unit to the gate terminal is lower than a threshold voltage of the corresponding switch.

According to the aspect of the present invention, the switch control unit may control a current falling period of a first switch and a current rising period of a second switch, among the plurality of switches, to overlap each other.

According to the aspect of the present invention, the switch control unit may turn off a first switch connected to one terminal of a first resistor among the plurality of switches if a sum of the currents sensed through the resistors connected to the other terminal of the first resistor among the plurality of resistors is equal to or higher than the reference current, and the one terminal of the first resistor may be connected to one of the plurality of switches.

According to the aspect of the present invention, the switch control unit may turn on the first switch connected to one terminal of the first resistor among the plurality of switches if the sum of the currents sensed through the resistors connected to the other terminal of the first resistor among the plurality of resistors is lower than the reference current, and the one terminal of the first resistor may be connected to one of the plurality of switches.

According to the aspect of the present invention, the switch control unit may include a reference voltage generation unit including a plurality of first operators generating a reference voltage corresponding to the reference current; and a plurality of switch control signal generation units changing the current sensed at one terminal of each of the plurality of resistors to a corresponding sensed voltage, comparing the sensed voltage with the reference voltage, and outputting a voltage difference between the sensed voltage and the reference voltage to the gate terminal of each of the plurality of switches.

According to the aspect of the present invention, each of the plurality of switch control signal generation units may include a second operator having a negative feedback loop; an input impedance unit connected to a (−) terminal of the second operator to change the sensed current to the sensed voltage; and a feedback impedance unit connected between an output terminal and the (−) terminal of the second operator, wherein the second operator compares the sensed voltage input to the (−) terminal with the reference voltage input to a (+) terminal, and outputs a gate input voltage corresponding to a difference between the sensed voltage and the reference voltage to the gate terminal of the corresponding switch.

According to the aspect of the present invention, the switch control unit may turn off a first switch among the plurality of switches if a sum of the currents sensed through the plurality of resistors is equal to or higher than a first reference current set in the first switch, and may turn off a second switch among the plurality of switches if the sum of the currents sensed through the plurality of resistors is equal to or higher than a second reference current set in the second switch.

According to the aspect of the present invention, the switch control unit may turn on the first switch among the plurality of switches if the sum of the currents sensed through the plurality of resistors is lower than the first reference current set in the first switch, and may turn on the second switch among the plurality of switches if the sum of the currents sensed through the plurality of resistors is lower than the second reference current set in the second switch.

According to the aspect of the present invention, the switch control unit may include a reference voltage generation unit including a plurality of first operators generating a plurality of reference voltages corresponding to a plurality of reference currents; and a plurality of switch control signal generation units comparing a sum of the currents sensed through the plurality of resistors with one of the plurality of reference voltages, and outputting a voltage difference between the sum of the currents and the one reference voltage to the gate terminal of one of the plurality of switches.

According to the aspect of the present invention, each of the plurality of switch control signal generation units may include a second operator summing the voltages sensed through the remaining resistors except for one resistor among the plurality of resistors and outputting the summed voltage as a first voltage; a third operator having a negative feedback loop and a (−) terminal connected to an output of the second operator; an input impedance unit connected to a (−) terminal of the third operator to change the current sensed through the one resistor as a second voltage; and a feedback impedance unit connected between an output terminal and the (−) terminal of the third operator, wherein the third operator compares a third voltage that is a sum of the first voltage and the second voltage input to the (−) terminal with the reference voltage, and outputs a gate input voltage corresponding to a difference between the summed voltage and the reference voltage to the gate terminal of the switch connected to the one resistor.

According to another aspect of the present invention, there is provided an LED luminescence apparatus, which includes a rectifying unit rectifying an AC voltage and generating a rectified voltage; a plurality of LEDs connected in series to an output terminal of the rectifying unit; a plurality of switches having drain terminals connected to cathodes of the plurality of LEDs, respectively; and a switch control unit detecting a voltage change amount of the rectified voltage by comparing the rectified voltage with a set reference rectified voltage, and outputting a control signal for varying a current that flows to the plurality of LEDs to a gate terminal of each of the plurality of switches in consideration of the voltage change amount.

According to the aspect of the present invention, the switch control unit may sense a current through a plurality of resistors connected to source terminals of the plurality of switches, respectively, generate a second reference current by reflecting the voltage change amount in a set first reference current, compare the sensed current with the second reference current, and output a voltage corresponding to a difference between the sensed current and the second reference current to the gate terminal of each of the plurality of switches.

According to the aspect of the present invention, the plurality of resistors may be connected in series with each other, one terminal of each of the plurality of resistors may be connected to a source terminal of each of the plurality of switches, and the other terminal of each of the plurality of resistors may be connected to one terminal of the adjacent resistor, and the other terminal of the resistor connected to the source terminal of the switch that is coupled to the LED connected to be most distant from the output terminal of the rectifying unit among the plurality of LEDs may be connected to a ground terminal.

According to the aspect of the present invention, as a value of each of the plurality of resistors is changed, a level of the current sensed at one terminal of each of the plurality of resistors may be changed.

According to the aspect of the present invention, the switch control unit may turn off a first switch connected to one terminal of a first resistor among the plurality of switches if a sum of the currents sensed through the resistors connected to the other terminal of the first resistor among the plurality of resistors is equal to or higher than the second reference current, and the one terminal of the first resistor may be connected to one of the plurality of switches.

According to the aspect of the present invention, the switch control unit may turn on a first switch connected to one terminal of a first resistor among the plurality of switches if the sum of the currents sensed through the resistors connected to the other terminal of the first resistor among the plurality of resistors is lower than the second reference current, and the one terminal of the first resistor may be connected to one of the plurality of switches.

According to the aspect of the present invention, the switch control unit may include a voltage change amount detection unit detecting the voltage change amount by comparing the rectified voltage with the reference rectified voltage; a reference voltage generation unit generating the second reference current by reflecting the voltage change amount in the set first reference current, and generating a reference voltage corresponding to the second reference current; and a switch control signal generation unit changing the current sensed at one terminal of each of the plurality of resistors to a corresponding sensed voltage, comparing the sensed voltage with the reference voltage, and outputting the voltage difference between the sensed voltage and the reference current to the gate terminal of each of the plurality of switches.

According to the aspect of the present invention, the reference voltage generation unit may downwardly adjust the second reference current as high as a level that corresponds to the voltage change amount in comparison to the first reference current if the voltage change amount has an upward value, and upwardly adjust the second reference current as high as the level that corresponds to the voltage change amount in comparison to the first reference current if the voltage change amount has a downward value.

According to the aspect of the present invention, the switch control signal generation unit may include a plurality of switch control signal generation units outputting the voltage difference to the plurality of switches, and each of the plurality of switch control signal generation units may include a first operator having a negative feedback loop; an input impedance unit connected to a (−) terminal of the first operator to change the sensed current to the sensed voltage; and a feedback impedance unit connected between an output terminal and a (−) terminal of a second operator, wherein the second operator compares the sensed voltage input to the (−) terminal with the reference voltage input to a (+) terminal, and outputs a gate input voltage corresponding to the difference between the sensed voltage and the reference voltage to the gate terminal of the corresponding switch.

According to the aspect of the present invention, each of the plurality of switches may be turned off if the voltage input from the switch control unit to the gate terminal is lower than a threshold voltage of the corresponding switch.

According to the aspect of the present invention, the switch control unit may control a current falling period of a first switch and a current rising period of a second switch, among the plurality of switches, to overlap each other.

According to still another aspect of the present invention, there is provided an LED luminescence apparatus, which includes a rectifying unit rectifying an AC voltage and generating a rectified voltage; a plurality of LEDs connected in series to an output terminal of the rectifying unit; and a current consumption unit having one terminal connected to a connection node of the rectifying unit and the plurality of LEDs to form a current path for the rectified voltage in a period during which the rectified voltage is lower than a forward voltage of one of the plurality of LEDs.

According to the aspect of the present invention, the current consumption unit may include a current consumption switch having a drain terminal connected to the output terminal of the rectifying unit.

According to the aspect of the present invention, the LED luminescence apparatus may further include a switch control unit sensing current through resistors connected to source terminals of switches, respectively, comparing the sensed current with a set reference current, and outputting a voltage corresponding to a difference between the sensed current and the set reference current to a gate terminal of the current consumption switch.

According to the aspect of the present invention, the LED luminescence apparatus may further include a plurality of switches having drain terminals connected to cathodes of the plurality of LEDs, respectively, wherein a source terminal of the current consumption switch is connected to a source terminal of the switch connected to the first LED that is adjacent to the rectifying unit among the plurality of switches, and the switch control unit senses the current through a plurality of resistors connected to source terminals of the plurality of switches, respectively, compares the sensed current with the set reference current, and outputs the voltage corresponding to the difference between the sensed current and the set reference current to the current consumption switch and the gate terminal of each of the plurality of switches.

According to the aspect of the present invention, the plurality of resistors may be connected in series with each other, one terminal of each of the plurality of resistors may be connected to the source terminal of each of the plurality of switches, and the other terminal of each of the plurality of resistors may be connected to one terminal of the adjacent resistor, and the other terminal of the resistor connected to the source terminal of the switch that is coupled to the LED connected to be most distant from the output terminal of the rectifying unit among the plurality of LEDs may be connected to a ground terminal.

According to the aspect of the present invention, as a value of each of the plurality of resistors is changed, a level of the current sensed at one terminal of each of the plurality of resistors may be changed.

According to the aspect of the present invention, the switch control unit may turn off the current consumption switch if a sum of the currents sensed through the resistors connected to the other terminal of the resistor connected to the current consumption switch among the plurality of resistors is equal to or higher than the reference current, and the switch control unit may turn on the current consumption switch if the sum of the currents sensed through the resistors connected to the other terminal of the resistor connected to the current consumption switch among the plurality of resistors is lower than the reference current.

According to the aspect of the present invention, the switch control unit may turn off a first switch connected to one terminal of a first resistor among the plurality of switches if the sum of the currents sensed through the resistors connected to the other terminal of the first resistor among the plurality of resistors is equal to or higher than the reference current, and the one terminal of the first resistor may be connected to one of the plurality of switches.

According to the aspect of the present invention, the switch control unit may turn on a first switch connected to one terminal of a first resistor among the plurality of switches if the sum of the currents sensed through the resistors connected to the other terminal of the first resistor among the plurality of resistors is lower than the reference current, and the one terminal of the first resistor may be connected to one of the plurality of switches.

According to the aspect of the present invention, the switch control unit may include a reference voltage generation unit generating a reference voltage corresponding to the reference current; and a switch control signal generation unit changing the current sensed at one terminal of each of the plurality of resistors to a corresponding sensed voltage, comparing the sensed voltage with the reference voltage, and outputting a voltage that corresponds to a difference between the sensed voltage and the reference voltage to the current consumption switch and the plurality of switches.

According to the aspect of the present invention, the switch control signal generation unit may include a plurality of switch control signal generation units outputting the voltage difference to the current consumption switch and the plurality of switches, and each of the plurality of switch control signal generation units may include a first operator having a negative feedback loop; an input impedance unit connected to a (−) terminal of the first operator to change the sensed current to the sensed voltage; and a feedback impedance unit connected between an output terminal and a (−) terminal of a second operator, wherein the second operator compares the sensed voltage input to the (−) terminal with the reference voltage input to a (+) terminal, and outputs a gate input voltage corresponding to the difference between the sensed voltage and the reference voltage to the gate terminal of the corresponding switch.

According to the aspect of the present invention, each of the plurality of switches may be turned off if the voltage input from the switch control unit to the gate terminal is lower than a threshold voltage of the corresponding switch.

According to the aspect of the present invention, the switch control unit may control a current falling period of a first switch and a current rising period of a second switch, among the plurality of switches, to overlap each other.

According to the LED luminescence apparatus having the above-described configuration according to the present invention, since the LED driving current that is almost similar to a sinusoidal wave such as an AC voltage is provided through sequential light emission driving of the plurality of LEDs connected in series with each other, deviation of the LED luminescence efficiency can be reduced, and problems caused by the power factor and the total harmonics distortion (THD) ratio can be solved.

According to the LED luminescence apparatus according to an embodiment of the present invention, since the current rising period and the current falling period of the switches driven in multistage are controlled to overlap each other through refection of the current flowing through other switches in order to control the current flowing through any one switch, overcurrent or deep that occurs in the LED driving current during the turn-on/turn-off of the switches can be prevented. Further, by removing noises, such as the overcurrent or deep, occurring in the LED driving current, EMI (Electro Magnetic Interference) characteristics that are required in the luminescence standards can be satisfied.

Further, according to the LED luminescence apparatus according to the present invention, since the current flowing to the LEDs is variably controlled depending on the voltage change amount of the AC power when the level of the AC power is upwardly or downwardly changed against the reference AC power, the current flowing to the whole LEDs can be kept constant.

According to the LED luminescence apparatus according to the present invention, since the LED driving current that is almost similar to a sinusoidal wave such as an AC voltage is provided through sequential light emission driving of the plurality of LEDs connected in series with each other, deviation of the LED luminescence efficiency can be reduced, and problems caused by the power factor and the total harmonics distortion (THD) ratio can be solved.

Further, according to the LED luminescence apparatus according to the present invention, the current is controlled to flow to the LED luminescence apparatus even in the period during which the output voltage of the rectifying unit becomes low and all LEDs do not emit light, and thus the impedance of the LED luminescence apparatus can satisfy the load conditions of the dimmer. The luminescence apparatus in the related art, such as the incandescent light bulb and the halogen lamp, can be easily replaced by the LED luminescence apparatus according to the present invention.

DETAILED DESCRIPTION OF THE ILLUSTRATED EMBODIMENTS

Figure 1:
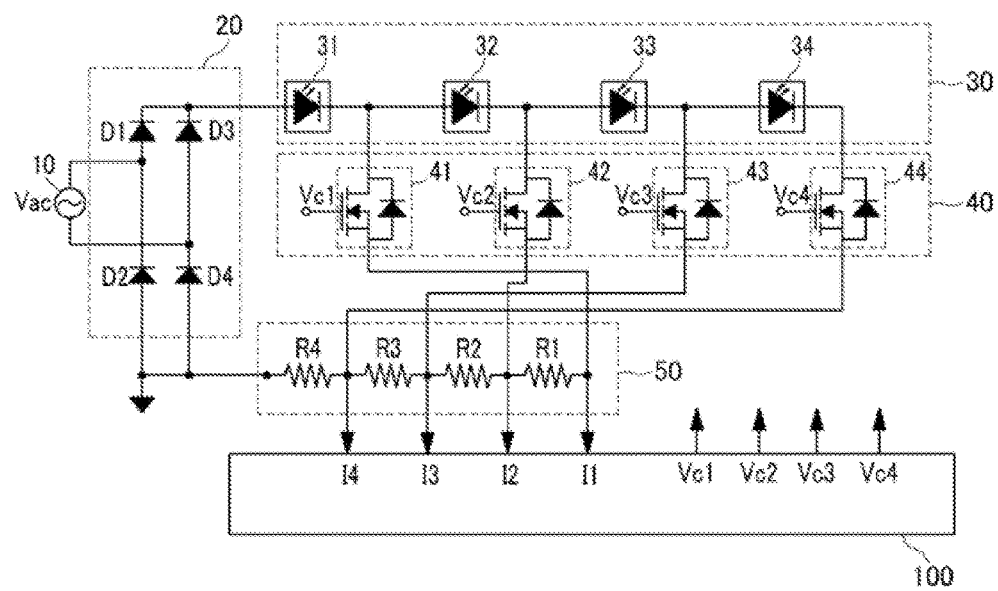
FIG. 1 is a diagram illustrating the configuration of an LED luminescence apparatus using AC power according to an embodiment of the present invention.

Hereinafter, preferred embodiments of the present invention will be described in detail with reference to the accompanying drawings to assist those of ordinary skill in the art to which the present invention pertains in easy implementation of the invention. However, the present invention can be implemented in diverse forms, and is not limited to the embodiments disclosed hereinafter. In the drawings, in order to clearly explain the present invention, portions that have no relation to the explanation are omitted, and in the entire description of the present invention, the same drawing reference numerals are used for the same elements across various figures.

In the entire description of the present invention, the term "connected to" that is used to designate a connection of one element to another element includes both a case that an element is "directly connected to" another element and a case that an element is electrically connected to another element via still another element.

FIG. 1 is a diagram illustrating the configuration of an LED luminescence apparatus using AC power supply according to an embodiment of the present invention.

As illustrated in FIG. 1, an LED luminescence apparatus according to an embodiment of the present invention includes an AC power supply 10, a rectifying unit 20, a luminescence element unit 30 including a plurality of LEDs 31 to 34, a switch unit 40 including a plurality of switches 41 to 44 having drain terminals connected to cathode terminals of the plurality of LEDs 31 to 34, respectively, a first resistor unit 50 including a plurality of resistors R1 to R4 each of which has one terminal connected to a source terminal of the previous switch and the other terminal connected to a source terminal of the next switch, and a first switch control unit 100 sensing currents I1 to I4 at each connection node between the one terminal of each of the plurality of resistors R1 to R4 and the switch, comparing the sensed currents with reference currents, and outputting voltage Vc1 to Vc4 corresponding to differences between the sensed currents and the reference currents to gate terminals of the plurality of switches 41 to 44.

The AC power supply 10 is an input power supply of the LED luminescence apparatus, and the AC power supply has the characteristics that the level and the direction of the AC power are changed according to a basic frequency.

The rectifying unit 20 may rectify the input AC power to change the AC power to a driving voltage Vin having a rectified AC voltage form.

For example, the rectifying unit 20 may be composed of a circuit that performs full-wave rectification or bridge rectification of the AC power of the sinusoidal waveform.

The plurality of LEDs 31 to 34 of the luminescence element unit 30 are connected in series to an output terminal of the rectifying unit 20. The plurality of LEDs 31 to 34 perform sequential light emission as the driving voltage Vin is increased, and do not emit light sequentially as the driving voltage Vin is decreased.

For convenience in explanation, FIG. 1 illustrates that the luminescence element unit 30 includes four LEDs 31 to 34. However, the number of LEDs in the luminescence element unit 30 is not limited thereto.

Further, each of the first to fourth LEDs 31 to 34 may be one or more LEDs connected in series or a plurality of LEDs of which the same polarities are connected together (that is, connected in parallel).

The plurality of switches 41 to 44 included in the switch unit 40 may be MOSFETs (Metal-Oxide Semiconductor Field-Effect Transistors). Drain terminals of the plurality of switches 41 to 44 are connected to cathode terminals of the plurality of LEDs 31 to 34, respectively, and gate terminals of the plurality of LEDs 31 to 34 are connected to the first switch control unit 100. Source terminals of the plurality of switches 41 to 44 are connected to terminals of the plurality of resistors R1 to R4, respectively.

In this case, the plurality of resistors R1 to R4 included in the first resistor unit 50 are connected in series with each other, and the other terminal of the fourth resistor R4 is connected to a ground terminal.

More specifically, one terminal of the first resistor R1 is connected to the source terminal of the first switch 41, and the other terminal of the first resistor R1 is connected to a connection node between the second resistor R2 and the second switch 42. One terminal of the second resistor R2 is connected to a connection node between the first resistor R1 and the second switch 42, and the other terminal of the second resistor R2 is connected to a connection node between the third resistor R3 and the third switch 43. One terminal of the third resistor R3 is connected to a connection node between the second resistor R2 and the third switch 43, and the other terminal of the third resistor R3 is connected to a connection node between the fourth resistor R4 and the fourth switch 44. One terminal of the fourth resistor R4 that is the last resistor is connected to a connection node between the third resistor R3 and the fourth switch 44, and the other terminal of the fourth resistor R4 is connected to a ground terminal.

Depending on the connection relations of the plurality of resistors R1 to R4 included in the first resistor unit 50, the current input to the first resistor unit 50 through the first switch 41 flows to the ground terminal through the first resistor R1, the second resistor R2, the third resistor R3, and the fourth resistor R4. The current input to the first resistor unit 50 through the second switch 42 flows to the ground terminal through the second resistor R2, the third resistor R3, and the fourth resistor R4. The current input to the first resistor unit 50 through the third switch 43 flows to the ground terminal through the third resistor R3 and the fourth resistor R4. The current input to the first resistor unit 50 through the fourth switch 44 flows to the ground terminal through the fourth resistor R4.

The first switch control unit 100 is connected to one terminal of each of the plurality of resistors R1 to R4, and senses the currents flowing to the plurality of switches 41 to 44. The level of the current sensed through the first resistor unit 50 may be changed as the values of the plurality of resistors R1 to R4 included in the first resistor unit 50 is changed.

More specifically, the first current I1 is a current sensed through the first resistor R1, the second resistor R2, the third resistor R3, and the fourth resistor R4, and the second current I2 is a current sensed through the second resistor R2, the third resistor R3, and the fourth resistor R4. The third current I3 is a current sensed through the third resistor R3 and the fourth resistor R4, and the fourth current I4 is a current sensed through the fourth resistor R4.

The first switch control unit 100 senses the first current I1 to the fourth current I4, compares the sensed currents with the reference currents, and outputs voltages Vc1 to Vc4 that correspond to the differences between the sensed currents and the reference currents to the gate terminals of the switches 41 to 44. The configuration and the operation of the first switch control unit 100 will be described with reference to FIG. 2.

Figure 2:
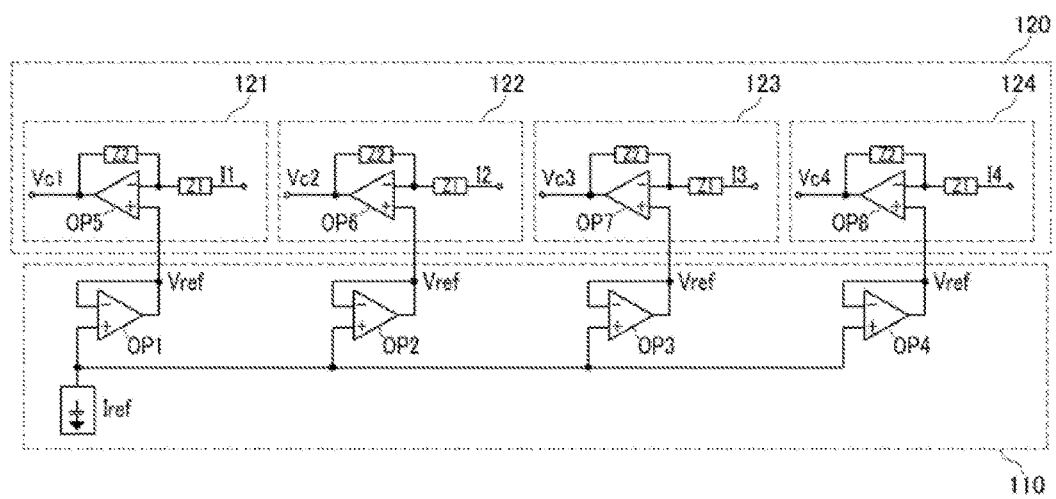
FIG. 2 is a diagram illustrating the configuration of a first switch control unit of FIG. 1.

FIG. 2 is a diagram illustrating the configuration of the first switch control unit of FIG. 1.

As illustrated in FIG. 2, the first switch control unit 100 includes a first reference voltage generation unit 110 and a first plural switch control signal generation unit 120.

The first reference voltage generation unit 110 generates set reference currents Iref as reference voltages Vref, and outputs the reference voltages Vref to the first plural switch control signal generation unit 120.

More specifically, the first reference voltage generation unit 110 includes operators OP1, OP2, OP3, and OP4 which have a gain of 1 and convert the set reference currents Iref into the reference voltages Vref. The reference voltages Vref output from the operators OP1, OP2, OP3, and OP4 are output to the first to fourth switch control signal generation units 121 to 124, respectively.

In this embodiment, the first reference voltage generation unit 110 generates reference voltages input to the first plural switch control signal generation unit 120 as the same reference voltage, and thus the resistance values of the resistors included in the first resistor unit 50 can be easily selected.

Since the first to fourth switch control signal generation units 121 to 124 have the same configuration and operation, the first switch control signal generation unit 121 will be described as a representative.

The first switch control signal generation unit 121 compares the voltage V1 that corresponds to the sensed current I1 sensed at one terminal of the first resistor R1 with the reference voltage Vref, and outputs a gate input voltage Vc1 that corresponds to the difference between the voltage V1 and the reference voltage Vref to the gate terminal of the first switch 41. Then, the level of the current flowing through the first switch 41 is controlled by the gate input voltage Vc1, and thus the turn-on/turn-off state of the first switch 41 is determined.

Through this, according to this embodiment, the current flowing through the plurality of switches 41 to 44 can be controlled so that the current does not exceed the set reference current using the first switch control unit 100, and thus it is possible to control constant current to flow through the plurality of LEDs regardless of the level change of the driving voltage Vin.

More specifically, the first switch control signal generation unit 121 includes an operator OP5 having a negative feedback loop, an input impedance Z1, and a feedback impedance Z2.

The input impedance Z1 is connected to a negative (−) terminal of the operator OP5, and the feedback impedance Z2 is connected between an output terminal and the negative terminal of the operator OP5. Depending on the values of the input impedance Z1 and the feedback impedance Z2, the gain of the operator OP5 is determined.

In this embodiment, the feedback impedance Z2 is set to be relatively higher than the input impedance Z1. Once the feedback impedance Z2 is set to be relatively higher than the input impedance Z1, the gain of the operator OP5 is increased, and the response speed of the operator OP5 becomes high to increase the stabilization characteristic of the operator OP5.

The sensed current I1 is input to the operator OP5 through the input impedance Z1 as the first voltage V1.

The operator OP5 compares the first voltage V1 input to the negative terminal with the reference voltage Vref input to the positive (+) terminal, and outputs the first gate input voltage Vc1 that corresponds to the difference between the first voltage V1 and the reference voltage Vref to the gate terminal of the first switch 41.

Through this, the VGS voltage between the gate terminal and the source terminal of the first switch 41 is varied by the first gate input voltage Vc1, and the turn-on/turn-off state of the first switch 41 is determined depending on the VGS voltage. More specifically, as the first gate input voltage Vc1 becomes higher, the VGS voltage is gradually increased, and as the VGS voltage becomes higher, the Rds(ON) resistance becomes lower to make the first switch 41 in a turn-on state. By contrast, as the first gate input voltage Vc1 becomes lower, the VGS voltage is gradually decreased, and as the VGS voltage becomes lower, the Rds(ON) resistance becomes higher to make the first switch 41 in a turn-off state.

The operation of the LED luminescence apparatus having the above-described configuration according to the present invention will be described with reference to FIGS. 3 and 4.

Figure 3:
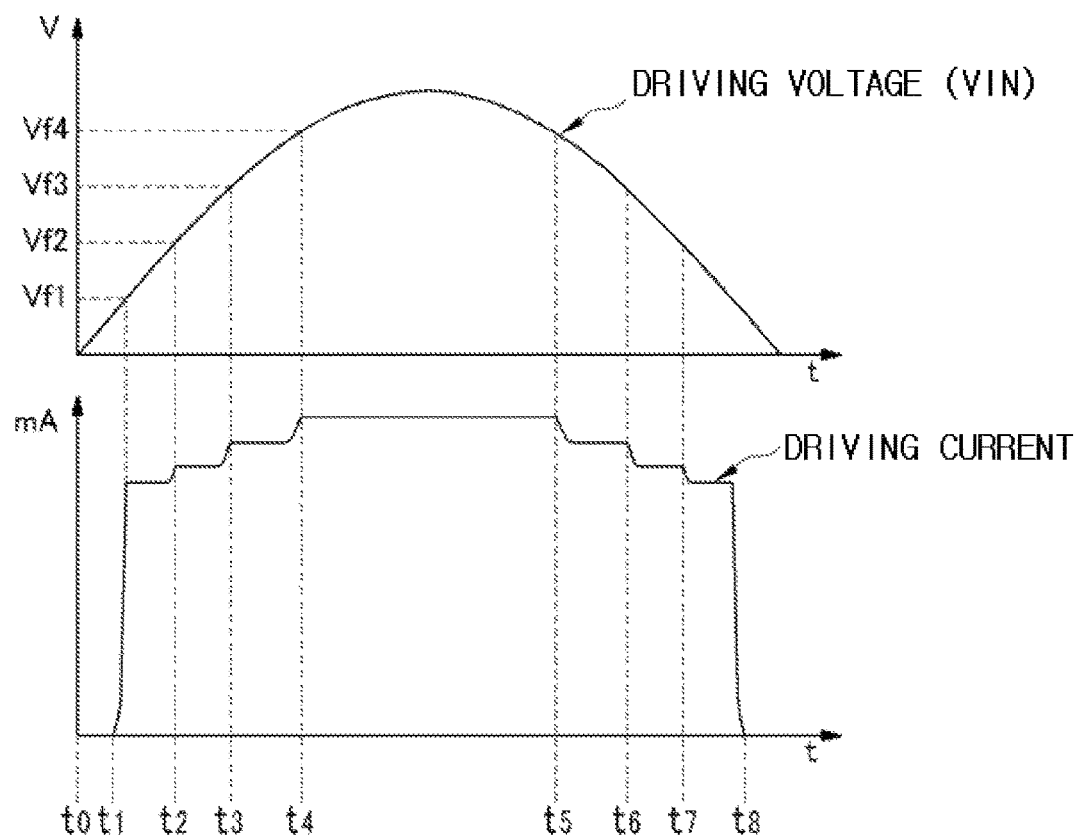
FIG. 3 are diagrams illustrating a driving voltage and a driving current of an LED according to an embodiment of the present invention.
Figure 4:
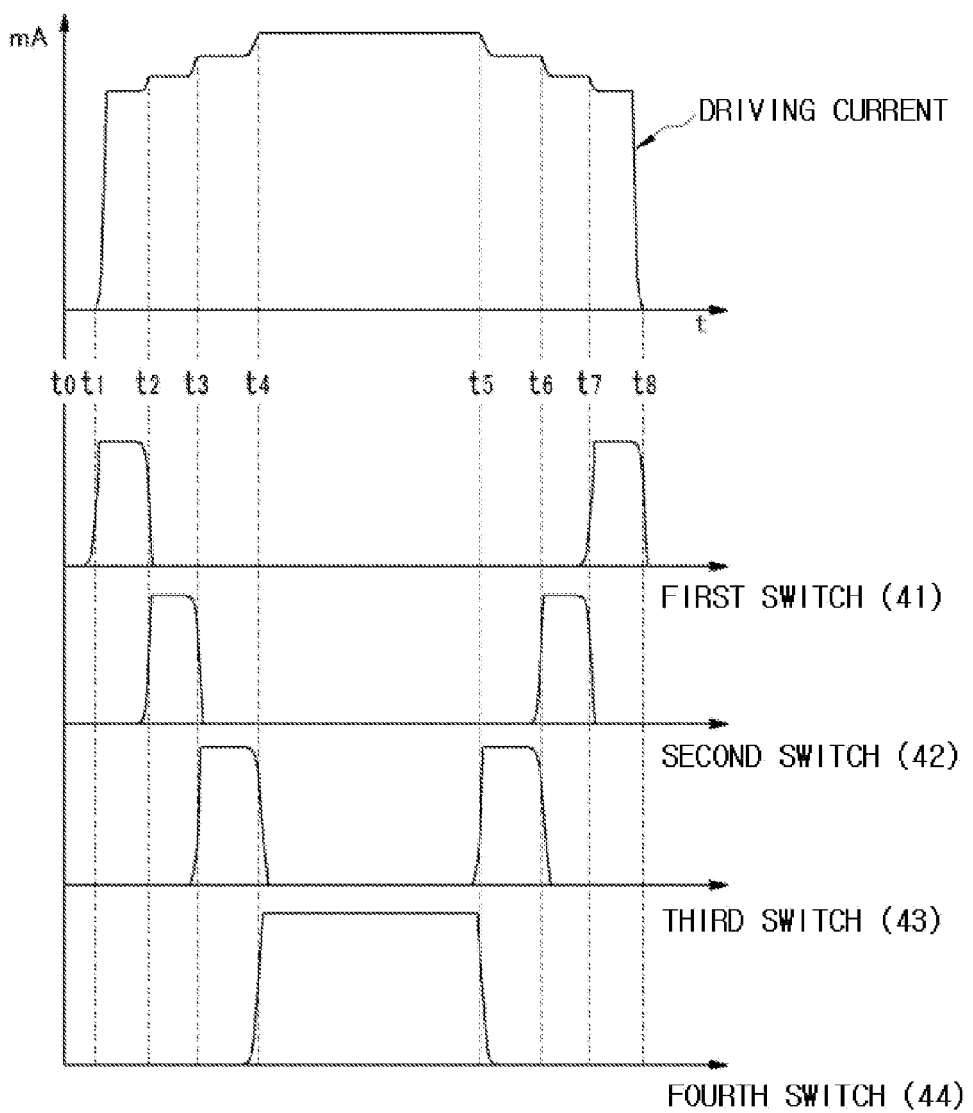
FIG. 4 is a diagram illustrating current flow through a plurality of switches according to an LED driving current according to an embodiment of the present invention.

FIG. 3 are diagrams illustrating a driving voltage and a driving current of an LED according to an embodiment of the present invention, and FIG. 4 is a diagram illustrating current flow through a plurality of switches according to an LED driving current according to an embodiment of the present invention.

Prior to the operation, it is assumed that the plurality of switches 41 to 44 are in a turn-on state, and sink current.

The driving voltage Vin that is rectified by the rectifying unit 20 is in a unipolar ripple voltage form. The driving voltage Vin is provided to the plurality of LEDs 31 to 34. As the driving voltage Vin is increased, the plurality of LEDs 31 to 34 sequentially emit light.

More specifically, in a period (in a time period of t0 to t1) where the driving voltage Vin is lower than a forward voltage Vf1 of the first LED 31 among the plurality of LEDs 31 to 34, all LEDs 31 to 34 are in non-light emission state.

However, if the driving voltage Vin becomes equal to or higher than the forward voltage Vf1 of the first LED 31 among the plurality of LEDs 31 to 34 (at a time point of t1), current flows to the first LED 31 and the first LED 31 emits light. At this time, in the same manner as at the time point of t1 in FIG. 4, gradually rising current flows to the first switch 41, and the first current I1 sensed at one terminal of the first resistor R1 rises.

If the driving voltage Vin becomes equal to or higher than the forward voltage Vf2 of the first LED 31 and the second LED 32 among the plurality of LEDs 31 to 34 (at a time point of t2), current flows to the first LED 31 and the second LED 32, and the first LED 31 and the second LED 32 emit light. At this time, the first current I1 sensed at one terminal of the first resistor R1 is increased as the second current I2 is increased due to the light emission of the second LED 32.

Accordingly, the first switch control signal generation unit 121 of the first switch control unit 100 compares the first voltage V1 that corresponds to the first current I1 with the reference voltage Vref, and outputs the first gate input voltage Vc1 that corresponds to the difference between the first voltage V1 and the reference voltage Vref to the gate terminal of the first switch 41. The first gate input voltage Vc1 is decreased as the first current I1 is increased, and thus the current flowing to the first switch 41 is gradually decreased as at the time point of t2 of FIG. 4. If no current flows to the first switch 41 due to the decrease of the current, the first switch 41 is turned off. That is, the first switch 41 is kept in a turn-off state if the sum of the currents flowing to the second switch 42 to the fourth switch 44 becomes equal to or higher than the reference current Iref.

In this case, at the time point of t2 of FIG. 4, the second LED 32 emits light, and a gradually rising current flows to the second switch 42.

According to the first embodiment of the present invention as described above, when the current of the first switch 41 is gradually decreased as at the time point of t2 of FIG. 4, the current of the second switch 42 may be gradually increased. According to the first embodiment of the present invention, the current falling period of the first switch 41 and the current rising period of the second switch 42 may be controlled to overlap each other.

If the driving voltage Vin becomes equal to or higher than the forward voltage Vf3 of the first to third LEDs 31 to 33 among the plurality of LEDs 31 to 34 (at a time point of t3), current flows to the first to third LEDs 31 to 33 to make the first to third LEDs 31 to 33 emit light. At this time, the second current I2 sensed at one terminal of the second resistor R2 is increased as the third LED 33 emits light.

Accordingly, the second switch control signal generation unit 122 of the first switch control unit 100 compares the second voltage V2 that corresponds to the second current I2 with the reference voltage Vref, and outputs the second gate input voltage Vc2 that corresponds to the difference between the second voltage V2 and the reference voltage Vref to the gate terminal of the second switch 42. The second gate input voltage Vc2 is decreased as the second current I2 is increased, and thus the current flowing to the second switch 42 is gradually decreased as at the time point of t3 of FIG. 4. If no current flows to the second switch 42 due to the decrease of the current, the second switch 42 is turned off. That is, the second switch 42 is kept in a turn-off state if the sum of the currents flowing to the third switch 43 and the fourth switch 44 becomes equal to or higher than the reference current Iref.

In this case, at the time point of t3 in FIG. 4, the third LED 33 emits light, and a gradually rising current flows to the third switch 43.

According to this embodiment, when the current of the second switch 42 is gradually decreased as at the time point of t3 of FIG. 4, the current of the third switch 43 may be gradually increased. That is, the current falling period of the second switch 42 and the current rising period of the third switch 43 may be controlled to overlap each other.

If the driving voltage Vin is further increased and becomes equal to or higher than the forward voltage Vf4 of the first to fourth LEDs 31 to 34 among the plurality of LEDs 31 to 34 (at a time point of t4), current flows to the first to fourth LEDs 31 to 34 to make the first to fourth LEDs 31 to 34 emit light. At this time, the third current I3 sensed at one terminal of the third resistor R3 is increased as the fourth LED 34 emits light.

Accordingly, the third switch control signal generation unit 123 of the first switch control unit 100 compares the third voltage V3 that corresponds to the third current I3 with the reference voltage Vref, and outputs the third gate input voltage Vc3 that corresponds to the difference between the third voltage V3 and the reference voltage Vref to the gate terminal of the third switch 43. The third gate input voltage Vc3 is decreased as the third current I3 is increased, and thus the current flowing to the third switch 43 is gradually decreased as at the time point of t4 of FIG. 4. If no current flows to the third switch 43 due to the decrease of the current, the third switch 43 is turned off. That is, the third switch 43 is kept in a turn-off state if the current flowing to the fourth switch 44 becomes equal to or higher than the reference current Iref.

In this case, at the time point of t4 in FIG. 4, the fourth LED 34 emits light, and a gradually rising current flows to the fourth switch 44.

According to this embodiment, when the current of the third switch 43 is gradually decreased as at the time point of t4 of FIG. 4, the current of the fourth switch 44 may be gradually increased. Through this, the current falling period of the third switch 43 and the current rising period of the fourth switch 44 may be controlled to overlap each other.

In a period during which the driving voltage Vin is equal to or higher than the forward voltage Vf4 (t4 to t5), the fourth switch control signal generation unit 124 of the first switch control unit 100 compares the fourth voltage V4 that corresponds to the fourth current I4 with the reference voltage Vref, and outputs the fourth gate input voltage Vc4 that corresponds to the difference between the fourth voltage V4 and the reference voltage Vref to the gate terminal of the fourth switch 44. In the first embodiment of the present invention, the fourth gate input voltage Vc4 is controlled to be always equal to or higher than the threshold voltage Vth of the fourth switch 44. Accordingly, the fourth switch 44 is kept in a turn-on state in the period during which the driving voltage Vin is equal to or higher than the forward voltage Vf4.

As described above, if the sum of the currents sensed through the resistors connected to the following terminal of any one resistor is equal to or higher than the reference current in the period during which the driving voltage Vin rises, the first switch control unit 100 controls the switch connected to the corresponding resistor to be turned off.

Through this, the current rising period and the current falling period of the plurality of switches 41 to 44 may be controlled to overlap each other.

In the following period during which the driving voltage Vin is reduced (t5 to t8), the operation of the first switch control unit 100 is performed in reverse order to the operation in the period t1 to t4 as described above.

Accordingly, the operation at the time point of t5 where the driving voltage Vin becomes equal to or lower than the forward voltage Vf4 will be described as a representative.

If the driving voltage Vin becomes equal to or lower than the forward voltage Vf4 (at the time point of t5), the fourth LED 34 does not emit light to decrease the fourth current I4, and as the fourth current I4 is decreased, the third current I3 sensed through the third resistor R3 becomes decreased.

Accordingly, the third switch control signal generation unit 123 of the first switch control unit 100 compares the third voltage V3 that corresponds to the third current I3 with the reference voltage Vref, and outputs the third gate input voltage Vc3 that corresponds to the difference between the third voltage V3 and the reference voltage Vref to the gate terminal of the third switch 43. The third gate input voltage Vc3 is increased as the third current I3 is decreased, and thus the current flowing to the third switch 43 is gradually increased as at the time point of t5 of FIG. 4. That is, the third switch 43 is in a turn-on state if the current flowing to the fourth switch 44 is lower than the reference current Iref. That is, the third switch 43 is kept in a turn-on state if the current flowing to the fourth switch 44 is lower than the reference current Iref.

In this case, at the time point of t5 in FIG. 4, as the fourth LED 34 does not emit light, a gradually decreasing current flows to the fourth switch 44, and at the same time, a gradually increasing current flows to the third switch 43. That is, the current falling period of the fourth switch 44 and the current rising period of the third switch 43 may be controlled to overlap each other.

As described above, if the sum of the currents sensed through the resistors connected to the following terminal of any one resistor is lower than the reference current in the period during which the driving voltage Vin falls, the first switch control unit 100 controls the switch connected to the corresponding resistor to be turned on. Through this, the current rising period and the current falling period of the plurality of switches 41 to 44 may be controlled to overlap each other.

As described above, according to this embodiment, since the LED driving current that is almost similar to a sinusoidal wave such as an AC voltage as illustrated in FIG. 3 is provided through sequential light emission driving of the plurality of LEDs 31 to 34 connected in series with each other, deviation of the LED luminescence efficiency can be reduced, and problems caused by the power factor and the total harmonics distortion (THD) ratio can be solved.

Further, according to this embodiment, since the first switch control unit 100 reflects the current flowing through the switches connected to the following terminal of any one switch in order to control the turn-on/turn-off of the corresponding switch, the current rising period and the current falling period of the switches driven in multistage can be controlled to overlap each other.

Further, according to this embodiment, by controlling the current rising period and the current falling period of the switches to overlap each other, overcurrent or deep that occurs in the LED driving current during the turn-on/turn-off of the switches can be prevented.

Further, according to this embodiment, by removing noises, such as the overcurrent or deep, occurring in the LED driving current, EMI (Electro Magnetic Interference) characteristics that are required in the luminescence standards can be satisfied.

Figure 5:
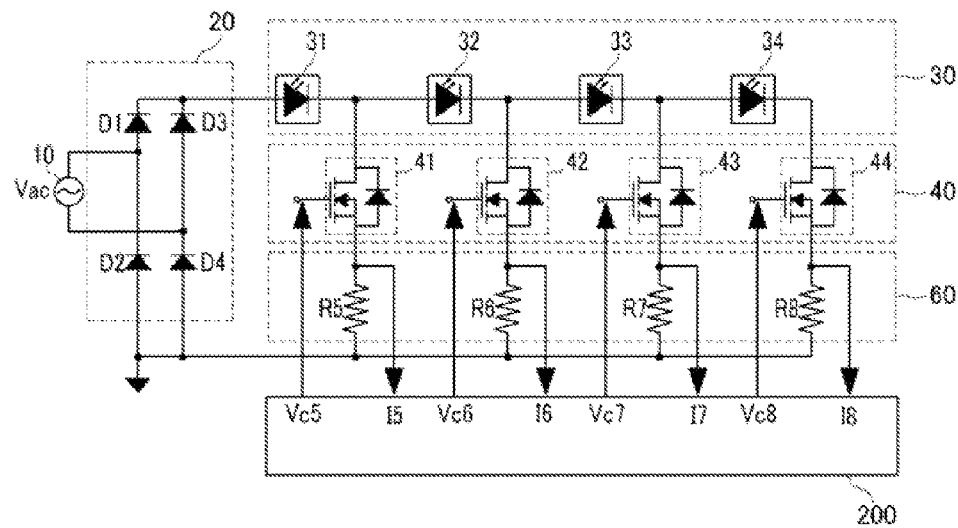
FIG. 5 is a diagram illustrating the configuration of an LED luminescence apparatus using AC power according to an embodiment of the present invention.

FIG. 5 is a diagram illustrating the configuration of an LED luminescence apparatus using AC power according to an embodiment of the present invention.

As illustrated in FIG. 5, an LED luminescence apparatus according to this embodiment includes an AC power supply 10, a rectifying unit 20, a luminescence element unit 30 including a plurality of LEDs 31 to 34, a switch unit 40 including a plurality of switches 41 to 44 having drain terminals connected to cathode terminals of the plurality of LEDs 31 to 34, respectively, a second resistor unit 60 including a plurality of resistors R5 to R8 each of which has one terminal connected to a source terminal of each of the switches 41 to 44 and the other terminal connected to a ground terminal, a second switch control unit 200 sensing currents at one terminal of each of the plurality of resistors R5 to R8, comparing the sensed currents I5 to I8 with reference currents, and outputting voltages Vc5 to Vc8 corresponding to differences between the sensed currents and the reference currents to gate terminals of the plurality of switches 41 to 44.

Since the AC power supply 10, the rectifying unit 20, the plurality of LEDs 31 to 34, and the plurality of switches 41 to 44 of the LED luminescence apparatus according to this embodiment are the same as those according to the embodiment as described above with reference to FIGS. 1 to 4, the explanation thereof will be omitted.

In this case, the plurality of resistors R5 to R8 included in the second resistor unit 60 are connected in parallel with each other. One terminal of each of the plurality of resistors R5 to R8 is connected to a source terminal of each of the plurality of switches 41 to 44, and the other terminal thereof is connected to the ground terminal.

Depending on the connection relations of the plurality of resistors R5 to R8 included in the second resistor unit 60, the current flowing through the first switch 41 flows to the ground terminal through the first resistor R5. The current flowing through the second switch 42 flows to the ground terminal through the second resistor R6. The current flowing through the third switch 43 flows to the ground terminal through the third resistor R7. The current flowing through the fourth switch 44 flows to the ground terminal through the fourth resistor R8.

The second switch control unit 200 is connected to one terminal of each of the plurality of resistors R5 to R8, and senses the currents I5 to I8 flowing to the plurality of switches 41 to 44.

The configuration and the operation of the second switch control unit 200 will be described with reference to FIG. 6.

Figure 6:
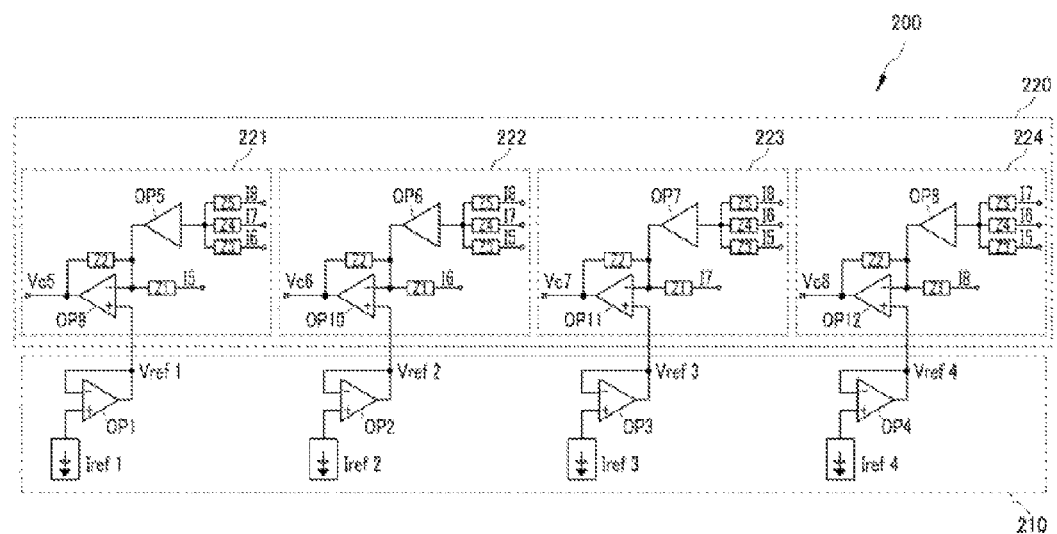
FIG. 6 is a diagram illustrating the configuration of a second switch control unit of FIG. 5.

FIG. 6 is a diagram illustrating the configuration of the second switch control unit of FIG. 5.

As illustrated in FIG. 6, the second switch control unit 200 includes a second reference voltage generation unit 210 and a second plural switch control signal generation unit 220.

The second reference voltage generation unit 210 generates a plurality of set reference currents Iref1 to Iref4 as a plurality of reference voltages Vref1 to Vref4, and outputs the plurality of reference voltages Vref1 to Vref4 to the second plural switch control signal generation unit 220.

More specifically, the second reference voltage generation unit 210 includes operators OP1, OP2, OP3, and OP4 which have a gain of 1 and convert the set first to fourth reference currents Iref1 to Iref4 into the first to fourth reference voltages Vref1 to Vref4. The first to fourth reference voltages Vref1 to Vref4 output from the operators OP1, OP2, OP3, and OP4 are output to the first to fourth switch control signal generation units 221 to 224, respectively.

In this embodiment, in generating the gate input voltages for controlling the plurality of switches 41 to 44, the second reference voltage generation unit 210 generates the reference voltages that correspond to the respective reference currents, and thus the currents flowing through the plurality of switches 41 to 44 can be freely set.

Since the first to fourth switch control signal generation units 221 to 224 have the same configuration and operation, the first switch control signal generation unit 221 will be described as a representative.

The second switch control signal generation unit 221 includes a first operator OP5 combining voltages that correspond to the currents I2 to I4 sensed through the remaining resistors R6 to R8 except for the first resistor R5, a second operator OP9 having a negative feedback loop, a first input impedance Z1, a feedback impedance Z2, and third to fifth input impedances Z3 to Z5.

The first operator OP5 receives the currents I2 to I4 sensed through the second to fourth resistors R6 to R8 through the third to fifth input impedances Z3 to Z5. The first operator OP5 sums the voltages that correspond to the currents sensed through the second to fourth resistors R6 to R8, and outputs the summed voltage to the second operator OP9.

The input impedance Z1 is connected to a negative (−) terminal of the second operator OP9, and the feedback impedance Z2 is connected between an output terminal and the (−) terminal of the second operator OP9. Depending on the values of the input impedance Z1 and the feedback impedance Z2, the gain of the second operator OP9 is determined.

In this embodiment, the feedback impedance Z2 is set to be relatively higher than the input impedance Z1. Once the feedback impedance Z2 is set to be relatively higher than the input impedance Z1, the gain of the second operator OP9 is increased, and the response speed of the second operator OP9 becomes high to increase the stabilization characteristic of the second operator OP9.

The sensed currents I2 to I4 are input to the second operator OP9 through the third to fifth input impedances Z3 to Z5 as the first voltage V1.

The sensed current I1 is input to the second operator OP9 through the first input impedance Z1 as the second voltage V2. Then, the third voltage V3 that is the sum of the first voltage V1 and the second voltage V2 is input to the negative (−) terminal of the second operator OP9.

The second operator OP9 compares the third voltage V3 input to the negative terminal with the first reference voltage Vref1 input to the positive (+) terminal, and outputs the first gate input voltage Vc5 that corresponds to the difference between the third voltage V3 and the first reference voltage Vref1 to the gate terminal of the first switch 41.

Through this, the VGS voltage between the gate terminal and the source terminal of the first switch 41 is varied by the first gate input voltage Vc5, and the turn-on/turn-off state of the first switch 41 is determined depending on the VGS voltage. More specifically, as the first gate input voltage Vc5 becomes higher, the VGS voltage is gradually decreased, and as the VGS voltage becomes lower, the Rds(ON) resistance becomes higher to make the first switch 41 in a turn-off state. By contrast, as the first gate input voltage Vc5 becomes lower, the VGS voltage is gradually higher, and as the VGS voltage becomes higher, the Rds(ON) resistance becomes lower to make the first switch 41 in a turn-on state.

The operation of the LED luminescence apparatus having the above-described configuration according to the second embodiment of the present invention will be described with reference to FIGS. 7 and 8.

Figure 7:
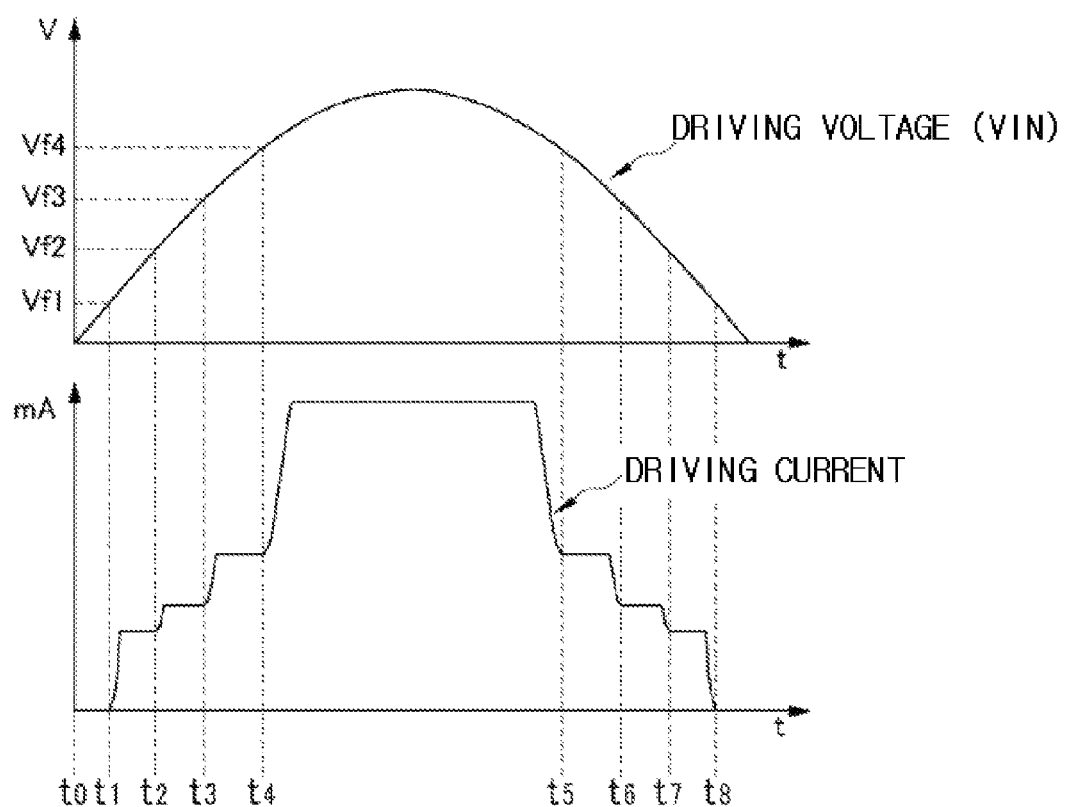
FIG. 7 are diagrams illustrating a driving voltage and a driving current of an LED according to an embodiment of the present invention.
Figure 8:
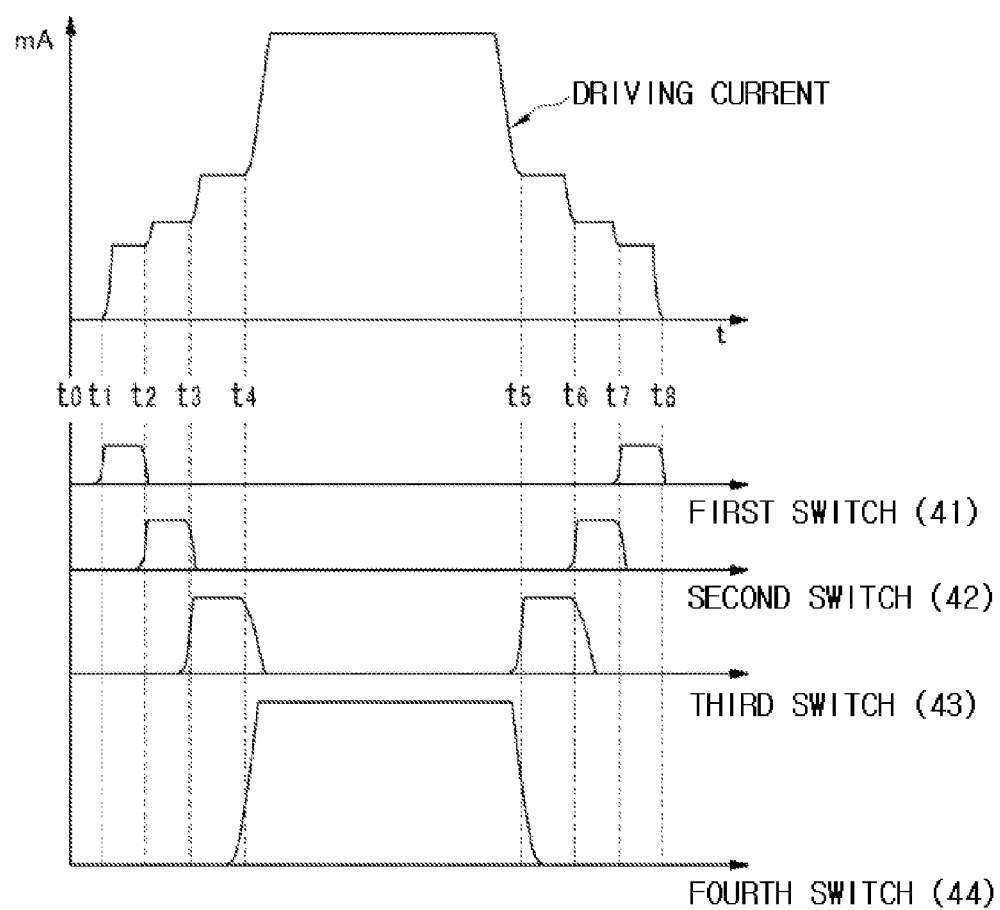
FIG. 8 is a diagram illustrating current flow through a plurality of switches according to an LED driving current according to an embodiment of the present invention.

FIG. 7 are diagrams illustrating a driving voltage and a driving current of an LED according to an embodiment of the present invention, and FIG. 8 is a diagram illustrating current flow through a plurality of switches according to an LED driving current according to an embodiment of the present invention.

Prior to the operation, it is assumed that the plurality of switches 41 to 44 are in a turn-on state, and sink current.

More specifically, in a period (in a time period of t0 to t1 of FIG. 7) where the driving voltage Vin is lower than a forward voltage Vf1 of the first LED 31 among the plurality of LEDs 31 to 34, all LEDs 31 to 34 are in non-light emission state.

However, if the driving voltage Vin becomes equal to or higher than the forward voltage Vf1 of the first LED 31 among the plurality of LEDs 31 to 34 (at a time point of t1), current flows to the first LED 31 and the first LED 31 emits light. At this time, in the same manner as at the time point of t1 in FIG. 8, gradually rising current flows to the first switch 41, and the first current I1 sensed at one terminal of the first resistor R1 rises.

If the driving voltage Vin becomes equal to or higher than the forward voltage Vf2 of the first LED 31 and the second LED 32 among the plurality of LEDs 31 to 34 (at a time point of t2), current flows to the first LED 31 and the second LED 32 and the first LED 31 and the second LED 32 emit light.

At this time, as the second current I2 sensed at one terminal of the second resistor R6 is increased, the voltage input to the negative terminal of the second operator OP9 of the first switch control signal generation unit 221 is increased.

Accordingly, the first switch control signal generation unit 221 of the second switch control unit 200 compares the third voltage V3 that corresponds to the first to fourth currents I1 to I4 with the first reference voltage Vref1, and outputs the first gate input voltage Vc5 that corresponds to the difference between the third voltage V3 and the first reference voltage Vref1 to the gate terminal of the first switch 41. The first gate input voltage Vc5 is decreased as the third voltage V3 is increased, and thus the current flowing to the first switch 41 is gradually decreased as at the time point of t2 in FIG. 8. If no current flows to the first switch 41 due to the decrease of the current, the first switch 41 is turned off. That is, the first switch 41 is kept in a turn-off state if the sum of the currents flowing to the second switch 42 to the fourth switch 44 becomes equal to or higher than the first reference current Iref1.

In this case, at the time point of t2 in FIG. 8, the second LED 32 emits light, and a gradually rising current flows to the second switch 42.

According to the embodiment of the present invention as described above, when the current of the first switch 41 is gradually decreased as at the time point of t2 in FIG. 8, the current of the second switch 42 may be gradually increased. According to the embodiment of the present invention, the current falling period of the first switch 41 and the current rising period of the second switch 42 may be controlled to overlap each other.

Like the time point of t2 in FIG. 8 as described above, at the time point of t3, the current falling period of the second switch 42 and the current rising period of the third switch 43 overlap each other, and at the time point of t4, the current falling period of the third switch 43 and the current rising period of the fourth switch 44 overlap each other.

In a period during which the driving voltage Vin is equal to or higher than the forward voltage Vf4 of the first to fourth LEDs 31 to 34 (t4 to t5), the fourth switch control signal generation unit 224 controls the fourth gate input voltage Vc8 output to the fourth switch 44 so that the fourth gate input voltage Vc8 becomes always equal to or higher than the threshold voltage Vth of the fourth switch 44. Accordingly, the fourth switch 44 is kept in a turn-on state in the period during which the driving voltage Vin is equal to or higher than the forward voltage Vf4.

As described above, if the currents sensed through all the resistors are equal to or higher than the reference current set at any one switch in the period during which the driving voltage Vin rises, the second switch control unit 200 controls the corresponding switch to be turned off. Through this, the current rising period and the current falling period of the plurality of switches 41 to 44 are controlled to overlap each other.

In the following period during which the driving voltage Vin is reduced (t5 to t8), the operation of the second switch control unit 100 is performed in reverse order to the operation in the period t1 to t4 as described above.

Accordingly, the operation at the time point of t5 where the driving voltage Vin becomes equal to or lower than the forward voltage Vf4 will be described as a representative.

If the driving voltage Vin becomes equal to or lower than the forward voltage Vf4 (at the time point of t5), the fourth LED 34 does not emit light to decrease the fourth current I8, and as the fourth current I8 is decreased, the third current I7 sensed through the third resistor R7 becomes decreased.

Accordingly, the third switch control signal generation unit 223 of the second switch control unit 100 compares the third voltage V3 that corresponds to the first to fourth currents with the third reference voltage Vref3, and outputs the third gate input voltage Vc7 that corresponds to the difference between the third voltage V3 and the third reference voltage Vref3 to the gate terminal of the third switch 43. The third gate input voltage Vc7 is increased as the third voltage V3 is decreased, and thus the current flowing to the third switch 43 is gradually increased as at the time point of t5 in FIG. 8. That is, the third switch 43 is in a turn-on state as the current of the fourth switch 44 is decreased.

In this case, at the time point of t5 in FIG. 8, as the fourth LED 34 does not emit light, a gradually decreasing current flows to the fourth switch 44, and at the same time, a gradually increasing current flows to the third switch 43. That is, the current falling period of the fourth switch 44 and the current rising period of the third switch 43 may be controlled to overlap each other.

As described above, if the sum of the currents sensed through all the resistors is lower than the reference current of the corresponding switch in the period during which the driving voltage Vin is decreased, the second switch control unit 200 controls the corresponding switch to be turned on. Through this, the current rising period and the current falling period of the plurality of switches 41 to 44 may be controlled to overlap each other.

As described above, according to the embodiment of the present invention, since the plurality of LEDs 31 to 34 connected in series with each other sequentially emit light to provide LED driving current that is almost similar to a sinusoidal wave such as an AC voltage as illustrated in FIG. 7, deviation of the LED luminescence efficiency can be reduced, and problems caused by the power factor and the total harmonics distortion (THD) ratio can be solved.

Further, according to the embodiment of the present invention, since the second switch control unit 200 reflects the current flowing through all other switches in order to control the current flowing through any one switch, the current rising period and the current falling period of the switches driven in multistage can be controlled to overlap each other.

Further, according to the embodiment of the present invention, by controlling the current rising period and the current falling period of the switches to overlap each other, overcurrent or deep that occurs in the LED driving current during the turn-on/turn-off of the switches can be prevented.

In addition, according to the embodiment of the present invention, by removing noises, such as the overcurrent or deep, occurring in the LED driving current, EMI characteristics that are required in the luminescence standards can be satisfied.

Figure 9:
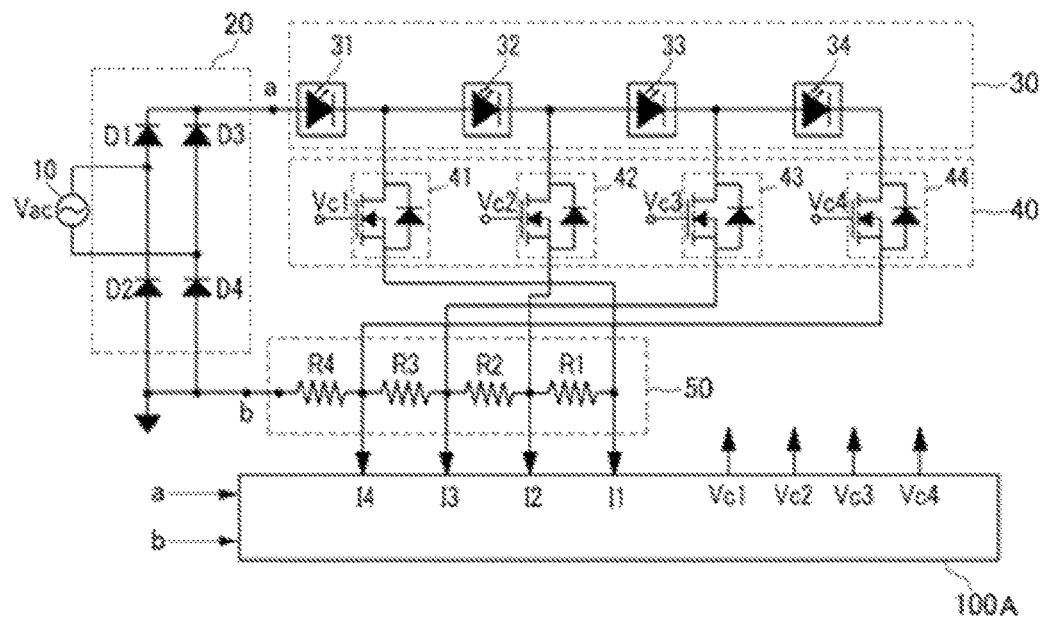
FIG. 9 is a diagram illustrating the configuration of an LED luminescence apparatus according to another embodiment of the present invention.

FIG. 9 is a diagram illustrating the configuration of an LED luminescence apparatus according to another embodiment of the present invention.

As illustrated in FIG. 9, an LED luminescence apparatus includes an AC power supply 10, a rectifying unit 20, a luminescence element unit 30 including a plurality of LEDs 31 to 34, a switch unit 40 including a plurality of switches 41 to 44 having drain terminals connected to cathode terminals of the plurality of LEDs 31 to 34, respectively, a resistor unit 50 including a plurality of resistors R1 to R4 each of which has one terminal connected to a source terminal of the previous switch and the other terminal connected to a source terminal of the next switch, and a switch control unit 100A sensing currents I1 to I4 at each connection node between the one terminal of each of the plurality of resistors R1 to R4 and the switch, comparing the sensed currents with reference currents, and outputting voltage Vc1 to Vc4 corresponding to differences between the sensed currents and the reference currents to gate terminals of the plurality of switches 41 to 44.

The AC power supply 10 is an input power supply of the LED luminescence apparatus, and the AC power supply has the characteristics that the level and the direction of the AC power are changed according to a basic frequency.

The rectifying unit 20 may rectify the input AC power to change the AC power to a driving voltage Vin having a rectified AC voltage form. For example, the rectifying unit 20 may be composed of a circuit that performs full-wave rectification or bridge rectification of the AC power of sinusoidal waveform.

The rectified voltage output from the rectifying unit 20 may be varied as the level of the AC power supply 10 is changed. If it is assumed that the effective voltage of the AC power supply 10 is typically 220 V, hereinafter, the rectified voltage output from the rectifying unit 20, of which the effective voltage is 220 V, is called a "reference rectified voltage", the rectified voltage of which the effective voltage exceeds 220 V is called an "upward rectified voltage", and the rectified voltage of which the effective voltage is lower than 220 V is called a "downward rectified voltage" (see FIGS. 11 and 12).

The plurality of LEDs 31 to 34 of the luminescence element unit 30 are connected in series to an output terminal of the rectifying unit 20. The plurality of LEDs 31 to 34 performs sequential light emission as the rectified voltage is increased, and does not emit light sequentially as the rectified voltage is decreased.

For convenience in explanation, FIG. 9 illustrates that the luminescence element unit 30 includes four LEDs 31 to 34. However, the number of LEDs in the luminescence element unit 30 is not limited thereto.

Further, each of the first to fourth LEDs 31 to 34 may be one or more LEDs connected in series or a plurality of LEDs of which the same polarities are connected together (that is, connected in parallel).

The plurality of switches 41 to 44 included in the switch unit 40 may be MOSFETs (Metal-Oxide Semiconductor Field-Effect Transistors). Drain terminals of the plurality of switches 41 to 44 are connected to cathode terminals of the plurality of LEDs 31 to 34, respectively, and gate terminals of the plurality of switches 41 to 44 are connected to the switch control unit 100A, respectively. Source terminals of the plurality of switches 41 to 44 are connected to terminals of the plurality of resistors R1 to R4, respectively.

In this case, the plurality of resistors R1 to R4 included in the resistor unit 50 are connected in series with each other, and the other terminal of the fourth resistor R4 that is the last resistor is connected to a ground terminal.

In the embodiment of the present invention, the last resistor is a resistor having one terminal connected to the source terminal of the switch 44 connected to the LED 34 that is connected to be most distant from the rectifying unit 20 among the plurality of LEDs 31 to 34 connected in series.

More specifically, one terminal of the first resistor R1 is connected to the source terminal of the first switch 41, and the other terminal of the first resistor R1 is connected to a connection node between the second resistor R2 and the second switch 42. One terminal of the second resistor R2 is connected to a connection node between the first resistor R1 and the second switch 42, and the other terminal of the second resistor R2 is connected to a connection node between the third resistor R3 and the third switch 43. One terminal of the third resistor R3 is connected to a connection node between the second resistor R2 and the third switch 43, and the other terminal of the third resistor R3 is connected to a connection node between the fourth resistor R4 and the fourth switch 44. One terminal of the fourth resistor R4 that is the last resistor is connected to a connection node between the third resistor R3 and the fourth switch 44, and the other terminal of the fourth resistor R4 is connected to a ground terminal.

Depending on the connection relations of the plurality of resistors R1 to R4 included in the resistor unit 50, the current input to the resistor unit 50 through the first switch 41 flows to the ground terminal through the first resistor R1, the second resistor R2, the third resistor R3, and the fourth resistor R4. The current input to the resistor unit 50 through the second switch 42 flows to the ground terminal through the second resistor R2, the third resistor R3, and the fourth resistor R4. The current input to the resistor unit 50 through the third switch 43 flows to the ground terminal through the third resistor R3 and the fourth resistor R4. The current input to the resistor unit 50 through the fourth switch 44 flows to the ground terminal through the fourth resistor R4.

The switch control unit 100A is connected to one terminal of each of the plurality of resistors R1 to R4, and senses the currents flowing to the plurality of switches 41 to 44. The level of the currents I1 to I4 sensed through the resistor unit 50 may be changed as the values of the plurality of resistors R1 to R4 included in the resistor unit 50 is changed.

More specifically, the first current I1 is a current sensed through the first resistor R1, the second resistor R2, the third resistor R3, and the fourth resistor R4, and the second current I2 is a current sensed through the second resistor R2, the third resistor R3, and the fourth resistor R4. The third current I3 is a current sensed through the third resistor R3 and the fourth resistor R4, and the fourth current I4 is a current sensed through the fourth resistor R4.

The switch control unit 100A senses the first current I1 to the fourth current I4, compares the sensed currents with the reference currents, and outputs voltages Vc1 to Vc4 that correspond to the differences between the sensed currents and the reference currents to the gate terminals of the switches 41 to 44. The configuration and the operation of the switch control unit 100A will be described with reference to FIGS. 10 to 13.

Figure 10:
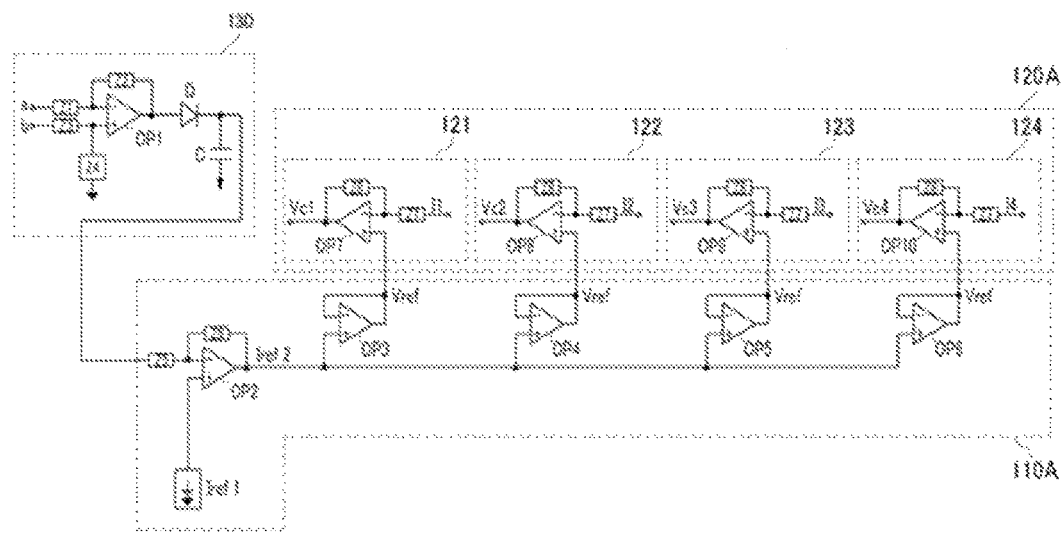
FIG. 10 is a diagram illustrating the configuration of a switch control unit of FIG. 9.
Figure 11:
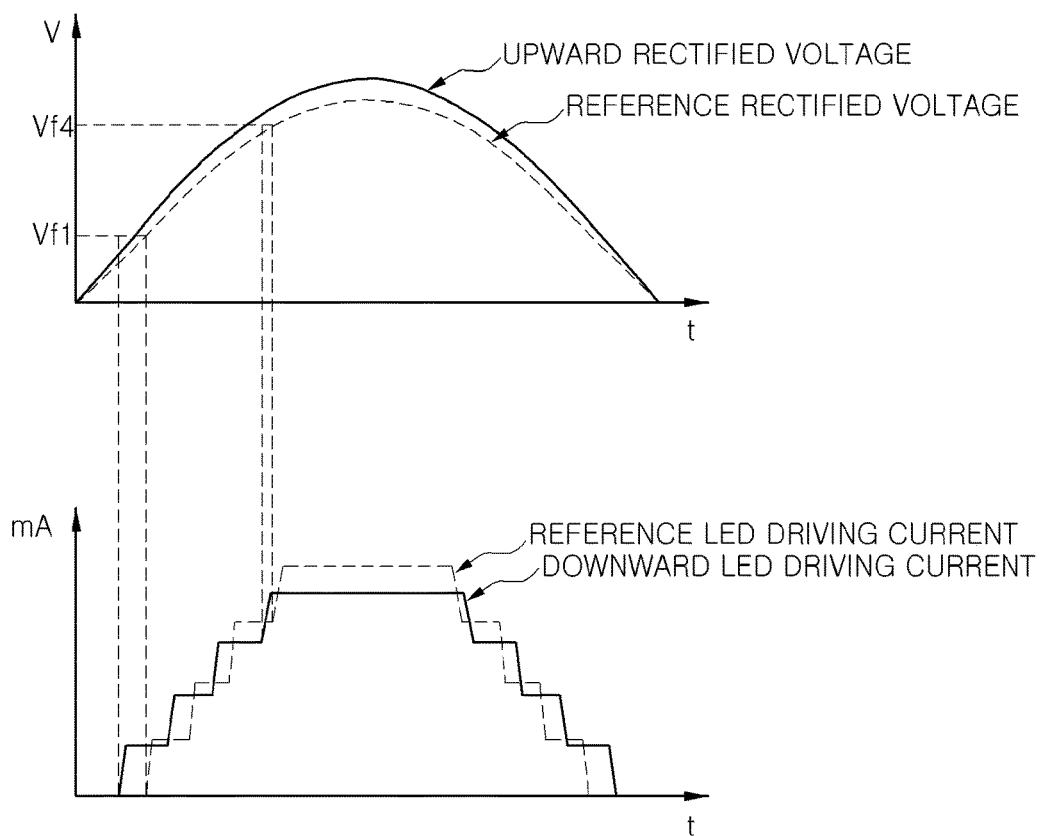
FIG. 11 are diagrams illustrating an increased upward rectified voltage against a reference rectified voltage and a downward driving current according to a reference driving current and the upward rectified voltage in the LED luminescence apparatus of FIG. 9.
Figure 12:
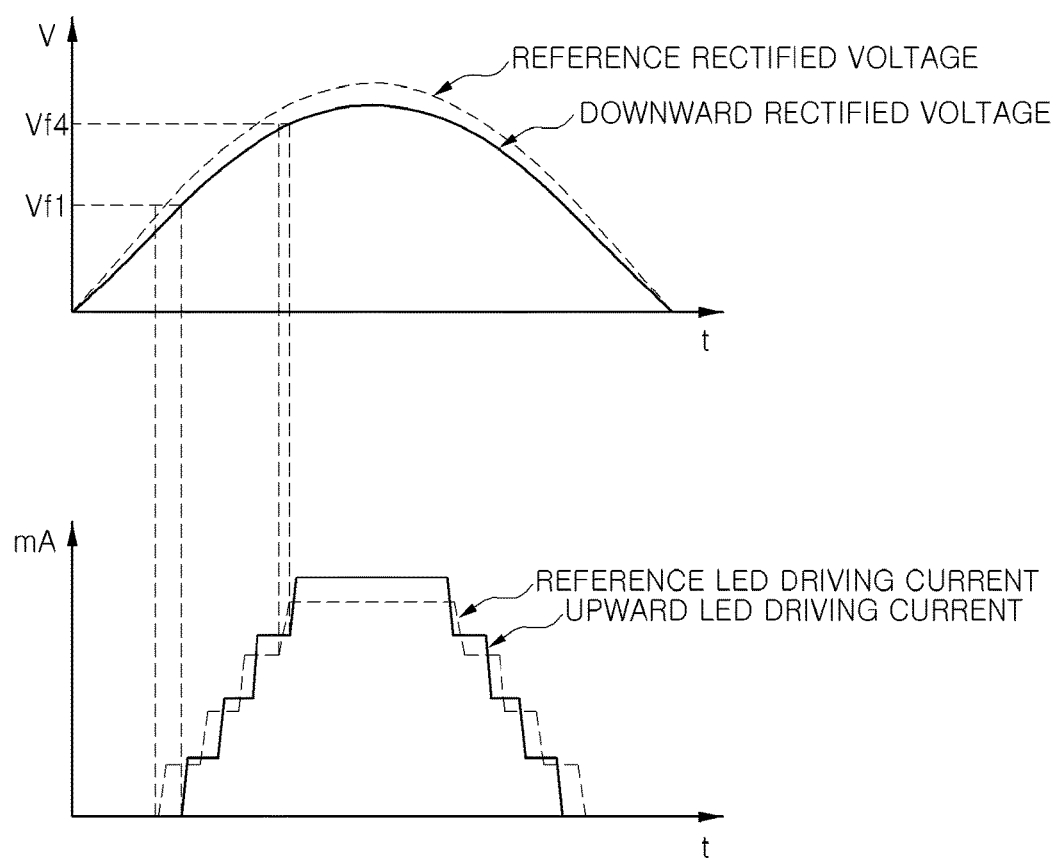
FIG. 12 are diagrams illustrating a decreased downward rectified voltage against a reference rectified voltage and an upward driving current according to a reference driving current and the downward rectified voltage in the LED luminescence apparatus of FIG. 9.

FIG. 10 is a diagram illustrating the configuration of the switch control unit of FIG. 9. FIG. 11 illustrates an increased upward rectified voltage against a reference rectified voltage, and a downward driving current according to a reference driving current and the upward rectified voltage. FIG. 12 illustrates a decreased downward rectified voltage against the reference rectified voltage, and an upward driving current according to the reference driving current and the downward rectified voltage.

As illustrated in FIG. 10, the switch control unit 100A includes a voltage change amount detection unit 130, a reference voltage generation unit 110A, and a switch control signal generation unit 120A.

The voltage change amount detection unit 130 detects a voltage change amount between a voltage input between an output terminal a of the rectifying unit 20 and the ground terminal b and the reference rectified voltage using a differential amplifier OP1.

In this case, the voltage change amount detection unit 130 may further include a diode D for separating the output terminal of the differential amplifier OP1 and the capacitor from each other, and a capacitor C for averaging, that is, DC-converting, the change amount of the output of the differential amplifier OP1.

On the assumption that the effective voltage of the AC power supply 10 is typically 220 V, the voltage level of the AC power may be changed to be higher or lower than 220 V. Accordingly, in the embodiment of the present invention, the voltage change amount detection unit 130 detects the voltage change amount of the AC voltage against the reference LED driving voltage using the differential amplifier OP1.

The reference voltage generation unit 110A compares the voltage change amount output from the voltage change amount detection unit 130 with the set first reference current Iref1 using the operator OP2 and outputs a second reference current Iref2 in which the voltage change amount is reflected.

If the voltage change amount is increased like the upward rectified voltage in FIG. 11, the reference voltage generation unit 110A outputs the second reference current Iref2 that is obtained by subtracting the current that corresponds to the voltage change amount from the first reference current Iref1.

Further, if the voltage change amount is decreased like the downward rectified voltage in FIG. 12, the reference voltage generation unit 110A outputs the second reference current Iref2 that is obtained by adding the current that corresponds to the voltage change amount to the first reference current Iref1.

As described above, according to the present invention, the level of the second reference current Iref2 that is applied to the control of the plurality of switches 41 to 44 may be changed in consideration of the variable characteristic of the AC power (or rectified voltage).

Next, the reference voltage generation unit 110A generates reference voltages that correspond to the second reference currents using the operators OP3 to OP6 and outputs the reference voltages to the switch control signal generation unit 120A. In the present invention, the reference voltage generation unit 110A generates and outputs one reference voltage to the switch control signal generation unit 120A, and thus the resistance value included in the storage unit 50 can be selected more easily.

The switch control signal generation unit 120A includes first to fourth switch control signal generation units 121 to 124. Since the first to fourth switch control signal generation units 121 to 124 have the same configuration and operation, the first switch control signal generation unit 121 will be described as a representative.

The first switch control signal generation unit 121 compares the voltage V1 that corresponds to the sensed current I1 sensed at one terminal of the first resistor R1 with the reference voltage Vref, and outputs a gate input voltage Vc1 that corresponds to the difference between the voltage V1 and the reference voltage Vref to the gate terminal of the first switch 41. Then, the level of the current flowing through the first switch Vc1 is controlled by the gate input voltage Vc1, and thus the turn-on/turn-off state of the first switch 41 is determined.

More specifically, the first switch control signal generation unit 121 includes an operator OP7 having a negative feedback loop, an input impedance Z7, and a feedback impedance Z8.

The input impedance Z7 is connected to a negative (−) terminal of the operator OP7, and the feedback impedance Z8 is connected between an output terminal and the negative terminal of the operator OP7.

In this embodiment, the feedback impedance Z8 is set to be relatively higher than the input impedance Z7 to increase the gain of the operator OP7. Further, as the gain of the operator OP7 is increased, the response speed of the operator OP7 becomes high to increase the stabilization characteristic of the operator OP7.

The operator OP7 compares the voltage V1 that corresponds to the sensed current I1 input to the negative terminal with the reference voltage Vref input to the positive terminal, and outputs the first gate input voltage Vc1 that corresponds to the difference between the voltage V1 and the reference voltage Vref to the gate terminal of the first switch 41.

By the first gate input voltage Vc1 input to the gate terminal, the VGS voltage between the gate terminal and the source terminal of the first switch 41 is varied, and the turn-on/turn-off state of the first switch 41 is determined depending on the VGS voltage. More specifically, as the first gate input voltage Vc1 becomes higher, the VGS voltage is gradually increased, and as the VGS voltage becomes higher, the Rds(ON) resistance becomes lower to make the first switch 41 in a turn-on state. By contrast, as the first gate input voltage Vc1 becomes lower, the VGS voltage is gradually decreased, and as the VGS voltage becomes lower, the Rds(ON) resistance becomes higher to make the first switch 41 in a turn-off state.

The operation of the switch control unit 100A will be summarized as follows.

If the voltage output from the rectifying unit 20 is an upward rectified voltage, the reference voltage generation unit 110A outputs a downwardly adjusted reference voltage Vref, and the plurality of switch control signal generation units 121 to 124 outputs the gate input voltages Vc1 to Vc4 so that the currents flowing to the respective switches are decreased depending on the downwardly adjusted reference voltage Vref.

Then, as illustrated in FIG. 11, the LED driving currents (downward LED driving currents) flowing to the first to third LEDs 31 to 33 are adjusted to be lower than the reference LED driving current.

By contrast, if the voltage output from the rectifying unit 20 is a downward rectified voltage, the reference voltage generation unit 110A outputs an upwardly adjusted reference voltage Vref, and the plurality of switch control signal generation units 121 to 124 outputs the gate input voltages Vc1 to Vc4 so that the currents flowing to the respective switches are increased depending on the upwardly adjusted reference voltage Vref.

Then, as illustrated in FIG. 12, the LED driving currents (upward LED driving currents) flowing to the first to third LEDs 31 to 33 are adjusted to be higher than the reference LED driving current.

As described above, in the embodiment of the present invention, the currents flowing to the respective LEDs are controlled by varying the effective voltage of the AC power, and thus the currents flowing to the whole LEDs can be controlled to be always kept constant regardless of the variable characteristic of the AC power.

The operation of the LED luminescence apparatus having the above-described configuration according to the embodiment of the present invention will be described with reference to FIG. 13.

Figure 13:
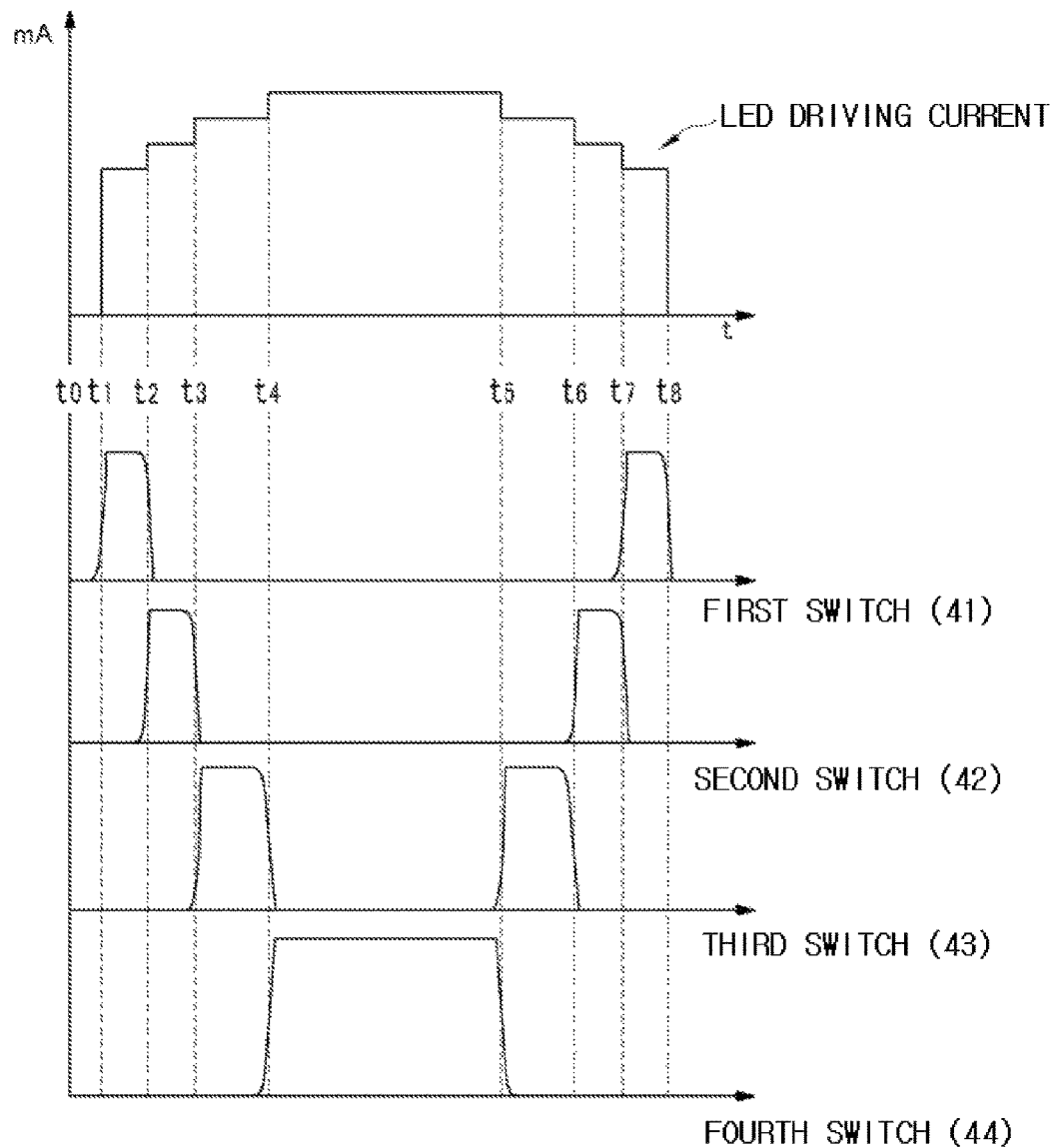
FIG. 13 is a diagram illustrating connection relations between an LED driving current and current flow of a plurality of switches according to another embodiment of the present invention.

FIG. 13 is a diagram illustrating connection relations between an LED driving current and current flow of a plurality of switches according to an embodiment of the present invention.

Prior to the operation, it is assumed that the plurality of switches 41 to 44 are in a turn-on state, and sink current. Also, in the current flow of the plurality of switches 41 to 44 depending on the upward LED driving current, the downward LED driving current, and the reference LED driving current, the operations to make the currents flow to the switches are the same although there is only a difference in whether the currents flow to the plurality of switches 41 to 44 earlier or later in time. Accordingly, the LED driving current in FIG. 5 may be any one of the upward LED driving current, the downward LED driving current, and the reference LED driving current.

As illustrated in FIG. 13, in a period (in a time period of t0 to t1) where the rectified voltage is lower than the forward voltage Vf1 of the first LED 31 among the plurality of LEDs 31 to 34, all LEDs 31 to 34 are in a non-light emission state.

However, if the rectified voltage becomes equal to or higher than the forward voltage Vf1 of the first LED 31 among the plurality of LEDs 31 to 34 (at a time point of t1), current flows to the first LED 31 to make the first LED 31 emit light. At this time, as at the time point of t1 in FIG. 13, a gradually rising current flows to the first switch 41, and the first current I1 sensed at one terminal of the first resistor R1 rises.

If the rectified voltage becomes equal to or higher than the forward voltage Vf2 of the first LED 31 and the second LED 32 among the plurality of LEDs 31 to 34 (at a time point of t2), current flows to the first LED 31 and the second LED 32 to make the first LED 31 and the second LED 32 emit light. At this time, the first current I1 sensed at one terminal of the first resistor R1 is increased as the second current I2 is increased due to the light emission of the second LED 32.

Accordingly, the first switch control signal generation unit 131 of the switch control unit 100 compares the first voltage V1 that corresponds to the first current I1 with the reference voltage Vref, and outputs the first gate input voltage Vc1 that corresponds to the difference between the first voltage V1 and the reference voltage Vref to the gate terminal of the first switch 41. The first gate input voltage Vc1 is decreased as the first current I1 is increased, and thus the current flowing to the first switch 41 is gradually decreased as at the time point of t2 in FIG. 5. If no current flows to the first switch 41 due to the decrease of the current, the first switch 41 is turned off. That is, the first switch 41 is kept in a turn-off state if the sum of the currents flowing to the second switch 42 to the fourth switch 44 becomes equal to or higher than the second reference current Iref.

In this case, at the time point of t2 in FIG. 13, the second LED 32 emits light, and a gradually rising current flows to the second switch 42.

As described above, according to the embodiment of the present invention, when the current of the first switch 41 is gradually decreased as at the time point of t2 in FIG. 13, the current of the second switch 42 may be gradually increased. According to the embodiment of the present invention, the current falling period of the first switch 41 and the current rising period of the second switch 42 may be controlled to overlap each other.

If the rectified voltage becomes equal to or higher than the forward voltage Vf3 of the first to third LEDs 31 to 33 among the plurality of LEDs 31 to 34 (at a time point of t3), current flows to the first to third LEDs 31 to 33 to make the first to third LEDs 31 to 33 emit light. At this time, the second current I2 sensed at one terminal of the second resistor R2 is increased as the third LED 33 emits light.

Accordingly, the second switch control signal generation unit 122 of the switch control unit 100A compares the second voltage V2 that corresponds to the second current I2 with the reference voltage Vref, and outputs the second gate input voltage Vc2 that corresponds to the difference between the second voltage V2 and the reference voltage Vref to the gate terminal of the second switch 42. The second gate input voltage Vc2 is decreased as the second current I2 is increased, and thus the current flowing to the second switch 42 is gradually decreased as at the time point of t3 in FIG. 5. If no current flows to the second switch 42 due to the decrease of the current, the second switch 42 is turned off. That is, the second switch 42 is kept in a turn-off state if the sum of the currents flowing to the third switch 43 and the fourth switch 44 becomes equal to or higher than the second reference current Iref.

In this case, at the time point of t3 in FIG. 13, the third LED 33 emits light, and a gradually rising current flows to the third switch 43.

According to the embodiment of the present invention, when the current of the second switch 42 is gradually decreased as at the time point of t3 in FIG. 13, the current of the third switch 43 may be gradually increased. That is, the current falling period of the second switch 42 and the current rising period of the third switch 43 may be controlled to overlap each other.

If the rectified voltage is further increased and becomes equal to or higher than the forward voltage Vf4 of the first to fourth LEDs 31 to 34 among the plurality of LEDs 31 to 34 (at a time point of t4), current flows to the first to fourth LEDs 31 to 34 to make the first to fourth LEDs 31 to 34 emit light. At this time, the third current I3 sensed at one terminal of the third resistor R3 is increased as the fourth LED 34 emits light.

Accordingly, the third switch control signal generation unit 123 of the switch control unit 100A compares the third voltage V3 that corresponds to the third current I3 with the reference voltage Vref, and outputs the third gate input voltage Vc3 that corresponds to the difference between the third voltage V3 and the reference voltage Vref to the gate terminal of the third switch 43. The third gate input voltage Vc3 is decreased as the third current I3 is increased, and thus the current flowing to the third switch 43 is gradually decreased as at the time point of t4 in FIG. 13. If no current flows to the third switch 43 due to the decrease of the current, the third switch 43 is turned off. That is, the third switch 43 is kept in a turn-off state if the current flowing to the fourth switch 44 becomes equal to or higher than the second reference current Iref2.

In this case, at the time point of t4 in FIG. 13, the fourth LED 34 emits light, and a gradually rising current flows to the fourth switch 44.

According to the embodiment of the present invention, when the current of the third switch 43 is gradually decreased as at the time point of t4 in FIG. 13, the current of the fourth switch 44 may be gradually increased. Through this, the current falling period of the third switch 43 and the current rising period of the fourth switch 44 may be controlled to overlap each other.

In a period during which the rectified voltage is equal to or higher than the forward voltage Vf4 (t4 to t5), the fourth switch control signal generation unit 124 of the switch control unit 100A compares the fourth voltage V4 that corresponds to the fourth current I4 with the reference voltage Vref, and outputs the fourth gate input voltage Vc4 that corresponds to the difference between the fourth voltage V4 and the reference voltage Vref to the gate terminal of the fourth switch 44. In the embodiment of the present invention, the fourth gate input voltage Vc4 is controlled to be always equal to or higher than the threshold voltage Vth of the fourth switch 44. Accordingly, the fourth switch 44 is kept in a turn-on state in the period during which the rectified voltage is equal to or higher than the forward voltage Vf4.

As described above, if the sum of the currents sensed through the resistors connected to the following terminal of any one resistor is equal to or higher than the reference current in the period during which the rectified voltage rises, the switch control unit 100A controls the switch connected to the corresponding resistor to be turned off. Through this, the current rising period and the current falling period of the plurality of switches 41 to 44 may be controlled to overlap each other.

In the following period during which the rectified voltage is decreased (t5 to t8), the operation of the switch control unit 100A is performed in reverse order to the operation in the period t1 to t4 as described above.

Accordingly, the operation at the time point of t5 where the rectified voltage becomes equal to or lower than the forward voltage Vf4 will be described as a representative.

If the rectified voltage becomes equal to or lower than the forward voltage Vf4 (at the time point of t5), the fourth LED 34 does not emit light to decrease the fourth current I4, and as the fourth current I4 is decreased, the third current I3 sensed through the third resistor R3 becomes decreased.

Accordingly, the third switch control signal generation unit 123 of the switch control unit 100A compares the third voltage V3 that corresponds to the third current I3 with the reference voltage Vref, and outputs the third gate input voltage Vc3 that corresponds to the difference between the third voltage V3 and the reference voltage Vref to the gate terminal of the third switch 43. The third gate input voltage Vc3 is increased as the third current I3 is decreased, and thus the current flowing to the third switch 43 is gradually increased as at the time point of t5 in FIG. 13. That is, the third switch 43 is in a turn-on state if the current flowing to the fourth switch 44 is lower than the reference current Iref. That is, the third switch 43 is kept in a turn-on state if the current flowing to the fourth switch 44 is lower than the second reference current Iref1.

In this case, at the time point of t5 in FIG. 13, as the fourth LED 34 does not emit light, a gradually decreasing current flows to the fourth switch 44, and at the same time, a gradually increasing current flows to the third switch 43. That is, the current falling period of the fourth switch 44 and the current rising period of the third switch 43 may be controlled to overlap each other.

As described above, if the sum of the currents sensed through the resistors connected to the following terminal of any one resistor is lower than the reference current in the period during which the rectified voltage falls, the switch control unit 100A controls the switch connected to the corresponding resistor to be turned on. Through this, the current rising period and the current falling period of the plurality of switches 41 to 44 may be controlled to overlap each other.

As described above, according to another embodiment of the present invention, since the LED driving current that is the almost similar to a sinusoidal wave such as an AC voltage as illustrated in FIGS. 11 and 12 is provided through sequential light emission driving of the plurality of LEDs 31 to 34 connected in series with each other, deviation of the LED luminescence efficiency can be reduced, and problems caused by the power factor and the total harmonics distortion (THD) ratio can be solved.

Further, according to another embodiment of the present invention, since the switch control unit reflects the current flowing to the switches connected to the following terminal of any one switch in order to control the turn-on/turn-off of the corresponding switch, the current rising period and the current falling period of the switches driven in multistage may be controlled to overlap each other.

Further, according to another embodiment of the present invention, by controlling the current rising period and the current falling period of the switches to overlap each other, overcurrent or deep that occurs in the LED driving current during the turn-on/turn-off of the switches can be prevented.

Further, according to another embodiment of the present invention, by removing noises, such as the overcurrent or deep, occurring in the LED driving current, EMI (Electro Magnetic Interference) characteristics that are required in the luminescence standards can be satisfied.

Further, according to another embodiment of the present invention, the current flowing to the LEDs is variably controlled depending on the voltage change amount even if the problem occurs that the level of the AC power is upwardly or downwardly changed against the reference AC power, and thus the current flowing to the whole LEDs can be kept constant.

Figure 14:
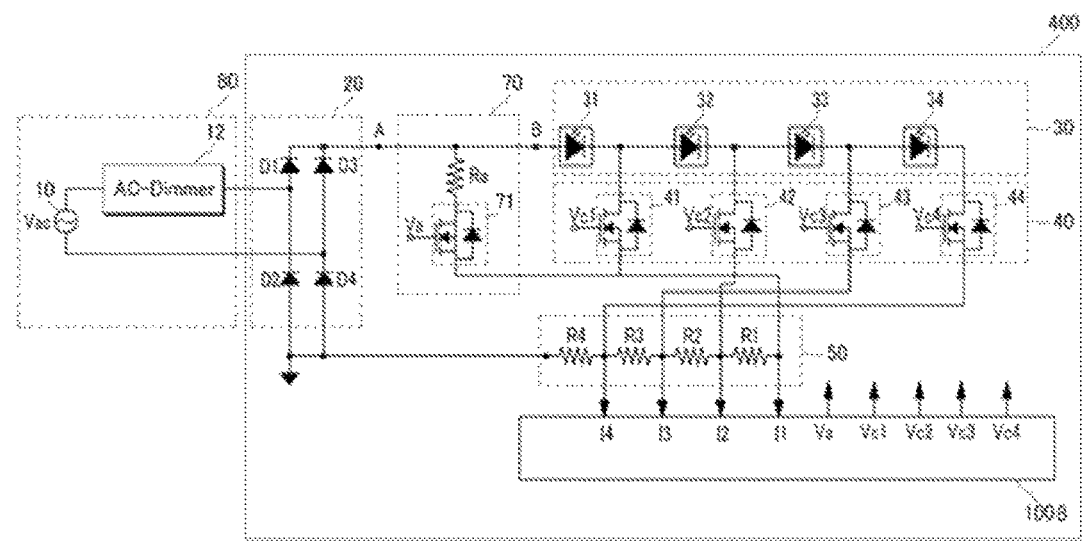
FIG. 14 is a diagram illustrating the configuration of an LED luminescence apparatus that is applied to a phase control type dimmer according to another embodiment of the present invention.
Figure 15:
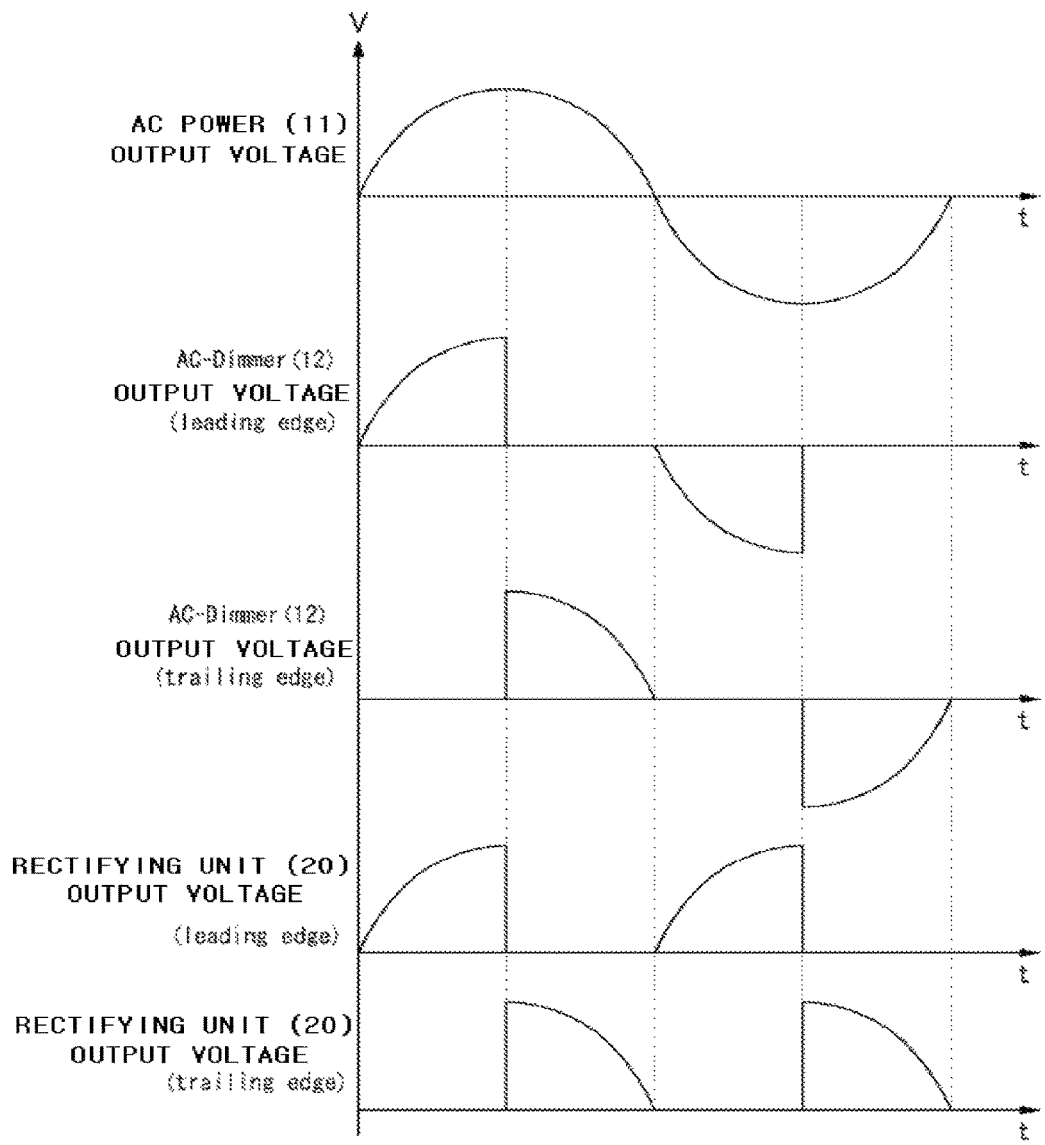
FIG. 15 is a diagram illustrating an output voltage of AC power, an output voltage of an AC dimmer, and an output voltage of a rectifying unit in the LED luminescence apparatus of FIG. 13.

FIG. 14 is a diagram illustrating the configuration of an LED luminescence apparatus that is applied to a phase control type dimmer according to another embodiment of the present invention. FIG. 15 is a diagram illustrating the output voltage of the AC power supply, the output voltage of an AC dimmer, and the output voltage of the rectifying unit in the LED luminescence apparatus of FIG. 13.

As illustrated in FIG. 14, an LED luminescence apparatus 400 according to another embodiment of the present invention controls the driving of the plurality of LEDs 31 to 34 using a voltage output from a phase control type dimmer 80.

First, as for the configuration of the dimmer 80, the dimmer 80 includes an AC power supply 10 and an AC dimmer 12. The AC power supply 10 is an input power supply of the LED luminescence apparatus as illustrated in FIG. 15, and outputs a voltage of which the level and the direction are changed according to a basic frequency.

The AC dimmer 12 is a phase control type dimming means using a triac switch, and outputs only a part of the phase of the voltage input from the AC power supply 10 according to an input brightness control signal. More specifically, if it is assumed that the brightness control signal input to the AC dimmer 12 is of 50%, the AC dimmer 12 outputs only 50% of the phase of the output voltage of the AC power supply 10 as illustrated in FIG. 15.

In this case, if the AC dimmer 12 is of a leading edge type, the AC dimmer 12 outputs 50% of the voltage that corresponds to the rising period of the output phase of the AC power supply 10, whereas if the AC dimmer 12 is of a trailing edge type, the AC dimmer 12 outputs 50% of the voltage that corresponds to the falling period of the output phase of the AC power supply 10. Although FIG. 14 illustrates that the dimmer 80 includes the AC power supply 10, the dimmer 80 may include the AC dimmer 12 only.

As described above, the output signal of the dimmer 80, of which the phase has been adjusted according to the brightness control signal, is input to the LED luminescence apparatus 400 according to the embodiment of the present invention.

Referring again to FIG. 14, the LED luminescence apparatus includes a rectifying unit 20 rectifying the voltage output from the dimmer 80, a luminescence element unit 30 including a plurality of LEDs 31 to 34, a switch unit 40 including a plurality of switches 41 to 44 having drain terminals connected to cathode terminals of the plurality of LEDs 31 to 34, respectively, a resistor unit 50 including a plurality of resistors R1 to R4 each of which has one terminal connected to a source terminal of the previous switch and the other terminal connected to a source terminal of the next switch, a current consumption unit 70 connected between the rectifying unit 20 and the plurality of LEDs 31 to 34 to consume the current according to the voltage output from the rectifying unit 20, and a switch control unit 100B sensing currents I1 to I4 at each connection node between the one terminal of each of the plurality of resistors R1 to R4 and the switch, comparing the sensed currents with reference currents, and outputting voltage Vc1 to Vc4 and Va corresponding to differences between the sensed currents and the reference currents to the plurality of switches 41 to 44 and a switch 71 of the current consumption unit 70.

The rectifying unit 20 may rectify the input AC power output from the dimmer 80 to converts the AC power into a rectified voltage as shown in FIG. 15. For example, the rectifying unit 20 may be composed of a circuit that performs full-wave rectification or bridge rectification of the AC voltage of a sinusoidal form.

The plurality of LEDs 31 to 34 of the luminescence element unit 30 are connected in series to an output terminal of the rectifying unit 20. The plurality of LEDs 31 to 34 performs sequential light emission as the rectified voltage is increased, and does not emit light sequentially as the rectified voltage is decreased.

For convenience in explanation, FIG. 14 illustrates that the luminescence element unit 30 includes four LEDs 31 to 34. However, the number of LEDs in the luminescence element unit 30 is not limited thereto.

Further, each of the first to fourth LEDs 31 to 34 may be one or more LEDs connected in series or a plurality of LEDs of which the same polarities are connected together (that is, connected in parallel).

The plurality of switches 41 to 44 included in the switch unit 40 may be MOSFETs (Metal-Oxide Semiconductor Field-Effect Transistors). Drain terminals of the plurality of switches 41 to 44 are connected to cathode terminals of the plurality of LEDs 31 to 34, respectively, and gate terminals of the plurality of LEDs 31 to 34 are connected to the switch control unit 100B. Source terminals of the plurality of switches 41 to 44 are connected to terminals of the plurality of resistors R1 to R4, respectively. The turn-on/turn-off of the plurality of switches 41 to 44 is determined by the signals input from the switch control unit 100B to the respective gate terminals.

The plurality of resistors R1 to R4 included in the resistor unit 50 are connected in series with each other, and the other terminal of the fourth resistor R4 that is the last resistor is connected to the ground terminal.

In the embodiment of the present invention, the last resistor is a resistor having one terminal connected to the source terminal of the switch 44 connected to the LED 34 that is connected to be the most distant from the rectifying unit 20.

More specifically, one terminal of the first resistor R1 is connected to the source terminal of the first switch 41, and the other terminal of the first resistor R1 is connected to a connection node between the second resistor R2 and the second switch 42. One terminal of the second resistor R2 is connected to a connection node between the first resistor R1 and the second switch 42, and the other terminal of the second resistor R2 is connected to a connection node between the third resistor R3 and the third switch 43. One terminal of the third resistor R3 is connected to a connection node between the second resistor R2 and the third switch 43, and the other terminal of the third resistor R3 is connected to a connection node between the fourth resistor R4 and the fourth switch 44. One terminal of the fourth resistor R4 that is the last resistor is connected to a connection node between the third resistor R3 and the fourth switch 44, and the other terminal of the fourth resistor R4 is connected to the ground terminal.

The current consumption unit 70 is connected between the output terminal of the rectifying unit 20 and one terminal of the first resistor R1 of the resistor unit 20. The current consumption unit 70 includes a resistor Ra and the switch 71.

The resistor Ra is a means for limiting the current flowing from the rectifying unit 20 to the switch 71. One terminal of the resistor Ra is connected to the output terminal of the rectifying unit 20, and the other terminal of the resistor Ra is connected to a drain terminal of the switch 71. The switch 71 is a MOSFET, and a source terminal of the switch 71 is connected to the source terminal of the first switch 41, and a gate terminal of the switch 71 is connected to the switch control unit 100B. More specifically, a connection node between the source terminal of the switch 71 and the source terminal of the first switch 41 is connected to the one terminal of the first resistor 71. The turn-on/turn-off of the switch 71 is determined by the signal input from the switch control unit 100B to the gate terminal thereof.

Depending on the connection relations between the switch unit 40, the resistor unit 50, and the current consumption unit 70, the current input to the resistor unit 50 through the switch 71 of the current consumption unit 70 and the current input to the resistor unit 50 through the first switch 41 flow to the ground terminal through the first resistor R1, the second resistor R2, the third resistor R3, and the fourth resistor R4. The current input to the resistor unit 50 through the second switch 42 flows to the ground terminal through the second resistor R2, the third resistor R3, and the fourth resistor R4. The current input to the resistor unit 50 through the third switch 43 flows to the ground terminal through the third resistor R3 and the fourth resistor R4. The current input to the resistor unit 50 through the fourth switch 44 flows to the ground terminal through the fourth resistor R4.

The switch control unit 100B is connected to one terminal of each of the plurality of resistors R1 to R4, and senses the currents flowing to the switch 71 of the current consumption unit 70 and the plurality of switches 41 to 44. The level of the currents I1 to I4 sensed through the resistor unit 50 may be changed as the values of the plurality of resistors R1 to R4 included in the resistor unit 50 are changed.

More specifically, the first current I1 is a current sensed through the first resistor R1, the second resistor R2, the third resistor R3, and the fourth resistor R4, and the second current I2 is a current sensed through the second resistor R2, the third resistor R3, and the fourth resistor R4. The third current I3 is a current sensed through the third resistor R3 and the fourth resistor R4, and the fourth current I4 is a current sensed through the fourth resistor R4.

The switch control unit 100B senses the first to fourth currents I1 to I4, compares the sensed currents with the reference currents, and outputs voltages Vc1 to Vc4 and Va that correspond to the differences between the sensed currents and the reference currents to the gate terminals of the switches 41 to 44 and 71. The configuration and the operation of the switch control unit 100B will be described with reference to FIG. 16.

Figure 16:
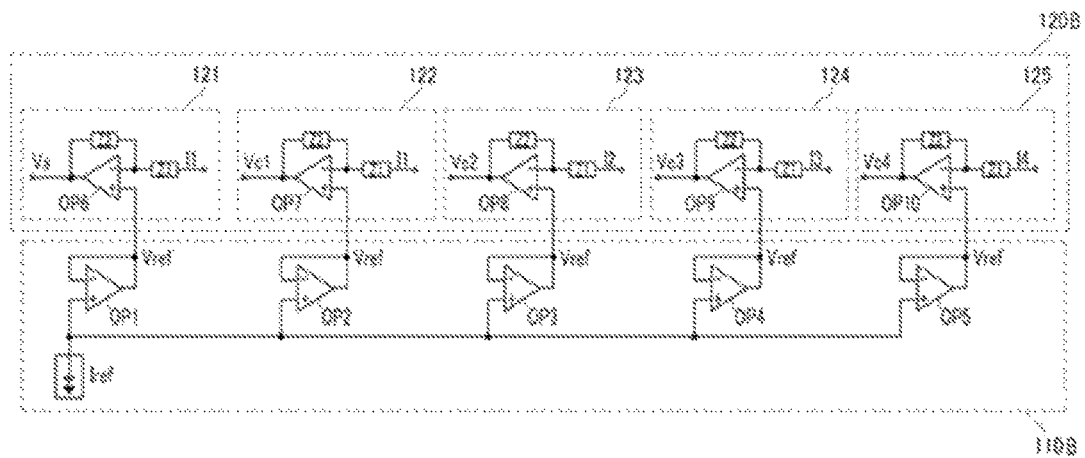
FIG. 16 is a diagram illustrating the configuration of a switch control unit of FIG. 13.

FIG. 16 is a diagram illustrating the configuration of the switch control unit of FIG. 13.

As illustrated in FIG. 16, the switch control unit 100B includes a reference voltage generation unit 110B and a switch control signal generation unit 120B.

The reference voltage generation unit 110B generates the set reference currents Iref as reference voltages Vref, and outputs the reference voltages Vref to the switch control signal generation unit 120B.

More specifically, the reference voltage generation unit 110 includes operators OP1, OP2, OP3, OP4, and OP5 which have a gain of 1 and convert the set reference currents Iref into the reference voltages Vref. The reference voltages Vref output from the operators OP1, OP2, OP3, OP4, and OP5 are output to the first to fifth switch control signal generation units 121 to 125, respectively.

In the embodiment of the present invention, the reference voltage generation unit 110B generates and outputs the reference voltages input to the first to fifth switch control signal generation units 121 to 125 as the same reference voltage, and thus the resistance values included in the first resistor unit 50 can be easily selected.

Although FIG. 16 illustrates that the reference voltage generation unit 110B generates one reference voltage, the reference voltage generation unit 110B may generate and output different reference voltages to the first to fifth switch control signal generation units 121 to 125.

The first switch control signal generation unit 121 compares the first current I1 with the reference voltage Vref, and outputs the voltage Va that corresponds to the difference between the first current I1 and the reference voltage Vref to the gate terminal of the switch 71 of the current consumption unit 70.

The second switch control signal generation unit 122 compares the first current I1 with the reference voltage Vref, and outputs the voltage Vc1 that corresponds to the difference between the first current I1 and the reference voltage Vref to the gate terminal of the first switch 41.

The third switch control signal generation unit 123 compares the second current I2 with the reference voltage Vref, and outputs the voltage Vc2 that corresponds to the difference between the second current I2 and the reference voltage Vref to the gate terminal of the second switch 42.

The fourth switch control signal generation unit 124 compares the third current I3 with the reference voltage Vref, and outputs the voltage Vc3 that corresponds to the difference between the third current I3 and the reference voltage Vref to the gate terminal of the third switch 43.

The fifth switch control signal generation unit 125 compares the fourth current I4 with the reference voltage Vref, and outputs the voltage Vc4 that corresponds to the difference between the fourth current I4 and the reference voltage Vref to the gate terminal of the fourth switch 41.

Accordingly, the turn-on/turn-off state of the switch 71 and the first to fourth switches 41 to 44 is determined as the levels of currents flowing to the respective switches are controlled by the gate input voltages Va and Vc1 to Vc4.

Through this, according to the embodiment of the present invention, the currents flowing through the switch 71 and the plurality of switches 41 to 44 can be controlled so that the currents do not exceed the set reference currents using the switch control unit 100B, and thus it is possible to control constant currents to flow to the plurality of LEDs 31 to 34 regardless of the level change of the rectified voltage output from the rectifying unit 20.

Since the first to fifth switch control signal generation units 121 to 125 have the same configuration and operation, the configuration of the first switch control signal generation unit 121 will be described as a representative.

The first switch control signal generation unit 121 compares the voltage V1 that corresponds to the sensed current I1 sensed at one terminal of the first resistor R1 with the reference voltage Vref, and outputs the gate input voltage Vc1 that corresponds to the difference between the voltage V1 and the reference voltage Vref to the gate terminal of the switch 71. Then, the level of the current flowing through the first switch Vc1 is controlled by the gate input voltage Vc1, and thus the turn-on/turn-off state of the first switch 41 is determined.

More specifically, the first switch control signal generation unit 121 includes an operator OP6 having a negative feedback loop, an input impedance Z1, and a feedback impedance Z2.

The input impedance Z1 is connected to a negative (−) terminal of the operator OP6, and the feedback impedance Z2 is connected between an output terminal and the negative terminal of the operator OP6.

In the embodiment of the present invention, the gain of the operator OP6 can be increased by setting the feedback impedance Z2 to be relatively higher than the input impedance Z1. Further, as the gain of the operator OP6 is increased, the response speed of the operator OP6 becomes high to increase the stabilization characteristic of the operator OP6.

The operator OP6 compares the voltage V1 that corresponds to the sensed current I1 input to the negative terminal with the reference voltage Vref input to the positive (+) terminal, and outputs the gate input voltage Va that corresponds to the difference between the voltage V1 and the reference voltage Vref to the gate terminal of the switch 71.

By the gate input voltage Va input to the gate terminal, the VGS voltage between the gate terminal and the source terminal of the switch 71 is varied, and the turn-on/turn-off state of the switch 71 is determined depending on the VGS voltage. More specifically, as the gate input voltage Va becomes higher, the VGS voltage is gradually increased, and as the VGS voltage becomes higher, the Rds(ON) resistance becomes lower to make the switch 71 in a turn-on state. By contrast, as the gate input voltage Va becomes lower, the VGS voltage is gradually decreased, and as the VGS voltage becomes gradually lower, the Rds(ON) resistance becomes higher to make the switch 71 in a turn-off state.

The operation of the LED luminescence apparatus having the above-described configuration according to another embodiment of the present invention will be described with reference to FIGS. 17 and 18.

Figure 17:
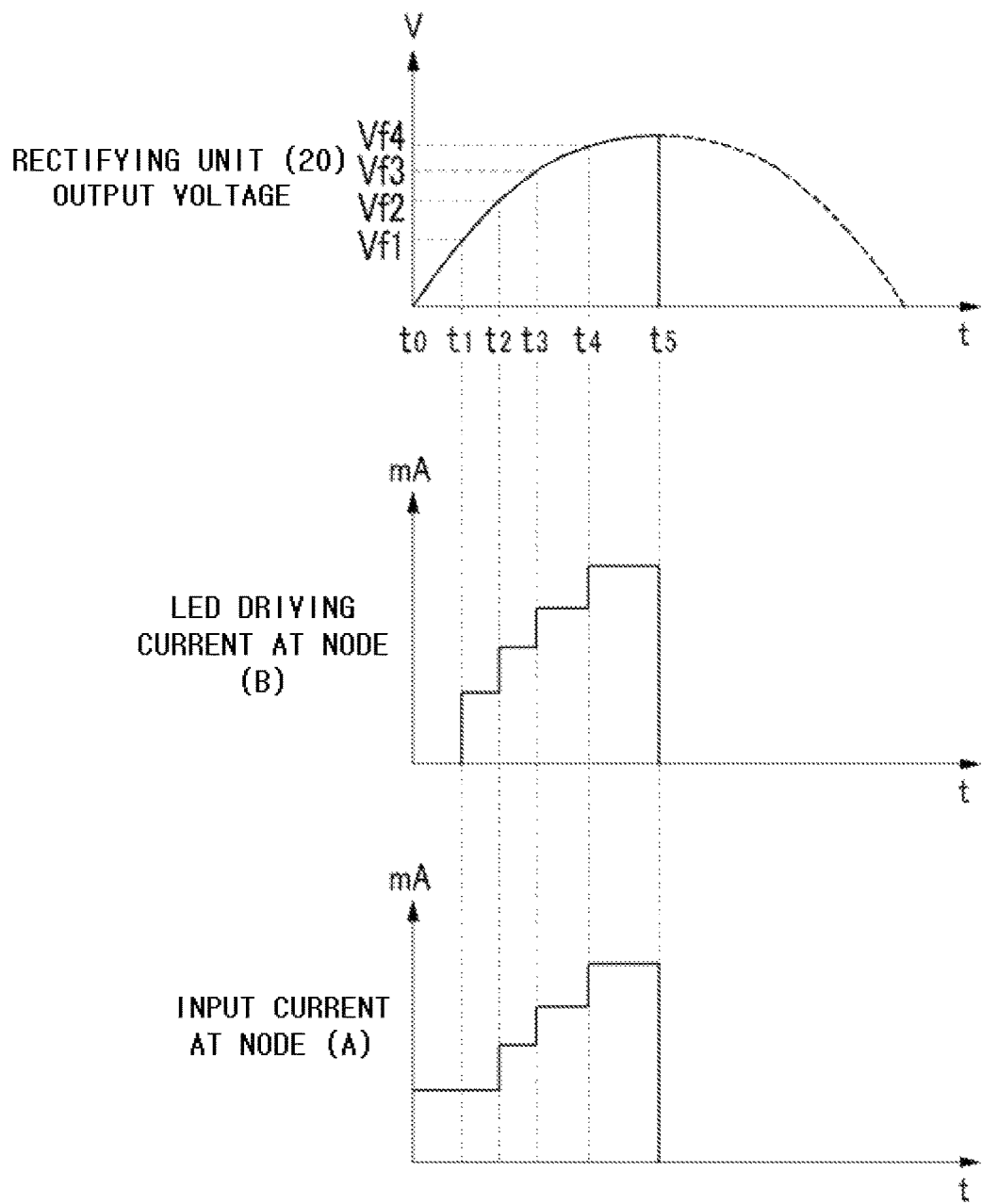
FIG. 17 is a diagram illustrating an output voltage of a rectifying unit, an LED driving current, and an input current according to another embodiment of the present invention.
Figure 18:
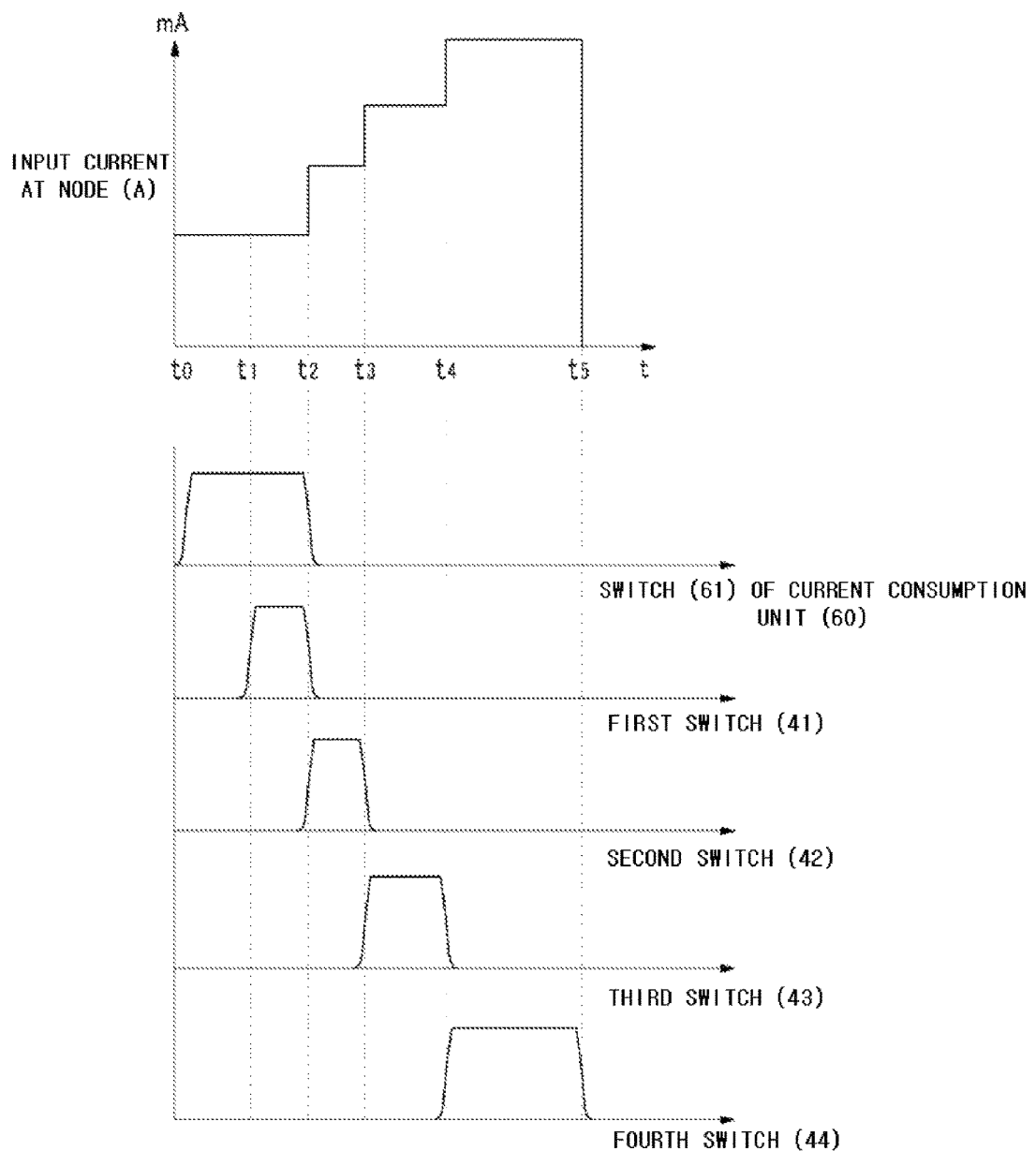
FIG. 18 is a diagram illustrating current flow through a plurality of switches according to an input current according to another embodiment of the present invention.

FIG. 17 is a diagram illustrating an output voltage of a rectifying unit, an LED driving current, and an input current according to another embodiment of the present invention, and FIG. 18 is a diagram illustrating current flow through a plurality of switches according to the input current according to another embodiment of the present invention.

FIGS. 17 and 18 illustrate the output voltage of the rectifying unit 20 that rectifies the AC voltage input from the dimmer 80 in the case where the dimmer 80 is of a leading edge type and the brightness control signal of the dimmer 80 is 50%.

The LED driving current represents the current flowing to the plurality of LEDs 31 to 34 with the current value measured at a node B in FIG. 14, and the input current represents the current flowing to the LED luminescence apparatus according to the rectified voltage with the current value measured at a node A in FIG. 14.

Prior to the operation, it is assumed that the plurality of switches 41 to 44 are in a turn-on state, and sink current.

As illustrated in FIG. 14, in the period (in the time period of t0 to t1) where the rectified voltage is lower than a forward voltage Vf1 of the first LED 31 among the plurality of LEDs 31 to 34, all LEDs 31 to 34 are in a non-light emission state. Accordingly, the LED driving current at the node B is approximately 0 mA in the period of t0 to t1.

However, according to the embodiment of the present invention, current flows through the switch 71 of the current consumption unit 70 that is located between the rectifying unit 20 and the plurality of LEDs 31 to 34. Accordingly, as at the time point of t0 in FIG. 18, a gradually rising current flows to the switch 71, and the first current I1 sensed at one terminal of the first resistor R1 rises.

Accordingly, the first switch control signal generation unit 121 of the switch control unit 100B compares the voltage V1 that corresponds to the first current I1 with the reference voltage Vref, and outputs the voltage Va that corresponds to the difference between the voltage V1 and the reference voltage Vref to the gate terminal of the switch 71. Accordingly, the current flowing through the switch 71 of the current consumption unit 70 is controlled to be constant.

As described above, according to the embodiment of the present invention, the current is controlled to flow through the current consumption unit 70 in the period of t0 to t1 where the output voltage of the rectifying unit 20 becomes low and all LEDs 31 to 34 do not emit light, and thus the current successively flows to the LED luminescence apparatus in the whole period of the AC power to make the impedance of the LED luminescence apparatus meet the load characteristics of the dimmer. Accordingly, the incandescent light bulb and the halogen lamp, which are used in the dimming device in the related art, can be replaced by the LED luminescence apparatus according to the embodiment of the present invention.

Further, since the period of t0 to t1 where all the LEDs 31 to 34 do not emit light is equal to or shorter than 10% of the whole LED driving period at maximum, and the level of the current in the period of t0 to t1 falls to lowest in the whole operation period, in the embodiment of the present invention, average consumed power consumed through the current consumption unit 70 is lowered.

If the rectified voltage becomes equal to or higher than the forward voltage Vf1 of the first LED 31 among the plurality of LEDs 31 to 34 (time point of t1), current flows to the first LED 31 to make the first LED 31 emit light. In this case, as at the time point of t1 in FIG. 18, current flows to the switch 71 successively, and a gradually rising current flows to the first switch 41.

In this case, the first switching control signal generation unit 121 and the second switch control signal generation unit 122 compare the voltage V1 that corresponds to the first current I1 sensed at one terminal of the first resistor R1 with the reference voltage Vref, and outputs the voltages Va and Vc1 that correspond to the difference between the voltage V1 and the reference voltage Vref to the gate terminals of the switch 71 and the first switch 41. Accordingly, the current flowing through the switch 71 and the first switch 41 is controlled to be constant.

Next, if the rectified voltage becomes equal to or higher than the forward voltage Vf2 of the first LED 31 and the second LED 32 among the plurality of LEDs 31 to 34 (time point of t2), current flows to the first LED 31 and the second LED 32 to make the first LED 31 and the second LED 32 emit light. In this case, as the second LED 32 emits light, the second current I2 is increased to cause the first current I1 sensed at one terminal of the first resistor R1 to be also increased.

Accordingly, the first switch control signal generation unit 121 and the second switch control signal generation unit 12 of the switch control unit 100B compares the first voltage V1 that corresponds to the first current I1 with the reference voltage Vref, and outputs the gate input voltages Va and Vc1 that corresponds to the difference between the first voltage V1 and the reference voltage Vref to the gate terminals of the switch 71 and the first switch 41. The voltage of the switch 71 and the first gate input voltage Vc1 are decreased as the first current I1 is increased, and thus the currents flowing to the switch 71 and the first switch 41 are gradually decreased as at the time point of t2 in FIG. 18. If no current flows to the switch 71 and the first switch 41 due to the decrease of the current, the switch 71 and the first switch 41 are turned off. That is, the switch 71 and the first switch 41 are kept in a turn-off state if the sum of the currents flowing to the second switch 42 to the fourth switch 44 becomes equal to or higher than the reference current Iref.

In this case, at the time point of t2 in FIG. 8, the second LED 32 emits light, and a gradually rising current flows to the second switch 42.

According to the embodiment of the present invention as described above, when the currents of the switch 71 and the first switch 41 are gradually decreased as at the time point of t2 in FIG. 18, the current of the second switch 42 may be gradually increased. According to the embodiment of the present invention, the current falling period of the switch 71 and the first switch 41 and the current rising period of the second switch 42 may be controlled to overlap each other.

If the rectified voltage becomes equal to or higher than the forward voltage Vf3 of the first to third LEDs 31 to 33 among the plurality of LEDs 31 to 34 (at a time point of t3), currents flow to the first to third LEDs 31 to 33 to make the first to third LEDs 31 to 33 emit light. At this time, the second current I2 sensed at one terminal of the second resistor R2 is increased as the third LED 33 emits light.

Accordingly, the third switch control signal generation unit 123 of the switch control unit 100B compares the second voltage V2 that corresponds to the second current I2 with the reference voltage Vref, and outputs the second gate input voltage Vc2 that corresponds to the difference between the second voltage V2 and the reference voltage Vref to the gate terminal of the second switch 42. The second gate input voltage Vc2 is decreased as the second current I2 is increased, and thus the current flowing to the second switch 42 is gradually decreased as at the time point of t3 in FIG. 18. If no current flows to the second switch 42 due to the decrease of the current, the second switch 42 is turned off. That is, the second switch 42 is kept in a turn-off state if the sum of the currents flowing to the third switch 43 and the fourth switch 44 becomes equal to or higher than the reference current Iref.

In this case, at the time point of t3 in FIG. 18, the third LED 33 emits light, and a gradually rising current flows to the third switch 43.

According to the embodiment of the present invention, when the current of the second switch 42 is gradually decreased as at the time point of t3 in FIG. 18, the current of the third switch 43 may be gradually increased. That is, the current falling period of the second switch 42 and the current rising period of the third switch 43 may be controlled to overlap each other.

If the rectified voltage is further increased and becomes equal to or higher than the forward voltage Vf4 of the first to fourth LEDs 31 to 34 among the plurality of LEDs 31 to 34 (at a time point of t4), current flows to the first to fourth LEDs 31 to 34 to make the first to fourth LEDs 31 to 34 emit light. At this time, the third current I3 sensed at one terminal of the third resistor R3 is increased as the fourth LED 34 emits light.

Accordingly, the fourth switch control signal generation unit 124 of the switch control unit 100B compares the third voltage V3 that corresponds to the third current I3 with the reference voltage Vref, and outputs the third gate input voltage Vc3 that corresponds to the difference between the third voltage V3 and the reference voltage Vref to the gate terminal of the third switch 43. The third gate input voltage Vc3 is decreased as the third current I3 is increased, and thus the current flowing to the third switch 43 is gradually decreased as at the time point of t4 in FIG. 18. If no current flows to the third switch 43 due to the decrease of the current, the third switch 43 is turned off. That is, the third switch 43 is kept in a turn-off state if the current flowing to the fourth switch 44 becomes equal to or higher than the reference current Iref.

In this case, at the time point of t4 in FIG. 18, the fourth LED 34 emits light, and a gradually rising current flows to the fourth switch 44.

According to the embodiment of the present invention, when the current of the third switch 43 is gradually decreased as at the time point of t4 in FIG. 18, the current of the fourth switch 44 may be gradually increased. Through this, the current falling period of the third switch 43 and the current rising period of the fourth switch 44 may be controlled to overlap each other.

In a period during which the rectified voltage is equal to or higher than the forward voltage Vf4 (t4 to t5), the fifth switch control signal generation unit 125 of the switch control unit 100B compares the fourth voltage V4 that corresponds to the fourth current I4 with the reference voltage Vref, and outputs the fourth gate input voltage Vc4 that corresponds to the difference between the fourth voltage V4 and the reference voltage Vref to the gate terminal of the fourth switch 44. In the embodiment of the present invention, the fourth gate input voltage Vc4 is controlled to be always equal to or higher than the threshold voltage Vth of the fourth switch 44. Accordingly, the fourth switch 44 is kept in a turn-on state in the period during which the rectified voltage is equal to or higher than the forward voltage Vf4.

As described above, if the sum of the currents sensed through the resistors connected to the following terminal of any one resistor is equal to or higher than the reference current in the period during which the rectified voltage rises, the switch control unit 100B controls the switch connected to the corresponding resistor to be turned off. Through this, the current rising period and the current falling period of the switch 71 and the plurality of switches 41 to 44 may be controlled to overlap each other.

FIGS. 17 and 18 illustrates only the period during which the rectified voltage rises depending on the output voltage of the dimmer 80. However, since the operation of the switch control unit 100B in the period during which the rectified voltage is decreased is performed in reverse order in the above-described period of t1 to t4, the embodiment of the present invention is also applicable even in the case where the dimmer 80 is of a trailing edge type.

In the following period during which the rectified voltage is reduced (t5 to t8), the operation of the switch control unit 100B is performed in reverse order to the operation in the period of t1 to t4 as described above.

For example, the operation at the time point (not illustrated) where the rectified voltage becomes equal to or lower than the forward voltage Vf4 will be described.

If the rectified voltage becomes equal to or lower than the forward voltage Vf4, the fourth LED 34 does not emit light to decrease the fourth current I4, and as the fourth current I4 is decreased, the third current I3 sensed through the third resistor R3 becomes decreased.

Accordingly, the fourth switch control signal generation unit 124 of the switch control unit 100B compares the third voltage V3 that corresponds to the third current I3 with the reference voltage Vref, and outputs the third gate input voltage Vc3 that corresponds to the difference between the third voltage V3 and the reference voltage Vref to the gate terminal of the third switch 43. The third gate input voltage Vc3 is increased as the third current I3 is decreased, and thus the current flowing to the third switch 43 is gradually increased. That is, the third switch 43 is in a turn-on state if the current flowing to the fourth switch 44 is lower than the reference current Iref. That is, the third switch 43 is kept in a turn-on state if the current flowing to the fourth switch 44 is lower than the reference current Iref.

In this case, at the time point where the rectified voltage becomes equal to or lower than the forward voltage Vf4, the fourth LED 34 does not emit light, a gradually decreasing current flows to the fourth switch 44, and at the same time, a gradually increasing current flows to the third switch 43. That is, the current falling period of the fourth switch 44 and the current rising period of the third switch 43 may be controlled to overlap each other.

As described above, if the sum of the currents sensed through the resistors connected to the following terminal of any one resistor is lower than the reference current in the period during which the rectified voltage is decreased, the switch control unit 100B controls the switch connected to the corresponding resistor to be turned on. Through this, the current rising period and the current falling period of the plurality of switches 41 to 44 may be controlled to overlap each other.

As described above, according to another embodiment of the present invention, the current is controlled to flow to the LED luminescence apparatus even in the period during which the output voltage of the rectifying unit 20 becomes low and all the LEDs do not emit light, and thus the impedance of the LED luminescence apparatus can meet the load conditions of the dimmer. Accordingly, the incandescent light bulb and the halogen lamp, which are used in the dimming device in the related art, can be easily replaced by the LED luminescence apparatus according to the embodiment of the present invention.

Further, according to another embodiment of the present invention, since the LED driving current that is almost similar to a sinusoidal wave such as an AC voltage is provided through sequential light emission driving of the plurality of LEDs 31 to 34 connected in series with each other using the rectified voltage, deviation of the LED luminescence efficiency can be reduced, and problems caused by the power factor and the total harmonics distortion (THD) ratio can be solved.

According to another embodiment of the present invention, the switch control unit reflects the current flowing to the switches connected to the following terminal of any one switch in order to control the turn-on/turn-off of the corresponding switch, and thus the current rising period and the current falling period of the switches driven in multistage can be controlled to overlap each other.

According to another embodiment of the present invention, by controlling the current rising period and the current falling period of the switches to overlap each other, the occurrence of overcurrent or deep that occurs in the LED driving current during the turn-on/turn-off of the switches can be prevented.

Further, according to another embodiment of the present invention, by removing noises, such as the overcurrent or deep, occurring in the LED driving current, EMI (Electro Magnetic Interference) characteristics that are required in the luminescence standards can be satisfied.

The description of the present invention as described above is exemplary, and it will be understood by those of ordinary skill in the art to which the present invention pertains that various changes in form and detail may be made therein without changing the technical idea or essential features of the present invention. Accordingly, it will be understood that the above-described embodiments are exemplary in all aspects and do not limit the scope of the present invention. For example, each constituent element explained as a single configuration may be dividedly implemented, and in the same manner, constituent elements explained as divided configurations may be implemented in a combined form.

The scope of the present invention is defined by the appended claims rather than the detailed description as described above, and it will be construed that all corrections and modifications derived from the meanings and scope of the following claims and the equivalent concept fall within the scope of the present invention.

The invention claimed is:

1. A light emitting diode (LED) luminescence apparatus, comprising:
 a rectifying unit configured to rectify an alternating current (AC) voltage and generate a rectified voltage;

LEDs connected in series to a first terminal of the rectifying unit;
switches comprising first terminals respectively connected to first electrodes of the LEDs; and
a switch control unit configured to:
sense respective currents through resistors respectively connected to second terminals of the switches;
compare each respectively sensed current with a reference current; and
output respective voltages corresponding to respective differences between the respectively sensed currents and the reference current to respective third terminals of the switches,
wherein the switch control unit comprises:
operators comprising negative feedback loops, each operator being configured to compare a reference voltage corresponding to the reference current with a respectively sensed voltage corresponding to a respectively sensed current, the respectively sensed voltage being adjusted according to negative feedback of a respective negative feedback loop.

2. The LED luminescence apparatus of claim 1, wherein:
the resistors are connected in series with one another;
a first terminal of a first resistor among the resistors is connected to a second terminal of a first switch among the switches;
a second terminal of the first resistor is connected to a second terminal of a second switch among the switches and a connection terminal of a second resistor among the resistors;
a first terminal of a last resistor among the resistors is connected to a second terminal of a last switch among the switches; and
a second terminal of the last resistor is connected to a ground terminal.

3. The LED luminescence apparatus of claim 1, wherein:
the resistors are connected in parallel with one another
first terminals of the resistors are respectively connected to the second terminals of the switches; and
second terminals of the resistors are connected to a ground terminal.

4. The LED luminescence apparatus of claim 1, wherein, as a value of each of the resistors is changed, a level of the sensed current at a first terminal of each of the resistors is changed.

5. The LED luminescence apparatus of claim 1, wherein each of the switches is turned off in response to the respective voltage input from the switch control unit being lower than a threshold voltage of the corresponding switch.

6. The LED luminescence apparatus of claim 1, wherein the switch control unit is configured to control a current falling period of a first switch, among the switches, and a current rising period of a second switch, among the switches, to overlap one another.

7. The LED luminescence apparatus of claim 1, wherein the switch control unit is configured to turn off a first switch, among the switches, connected to a first terminal of a first resistor, among the resistors, in response to a sum of the sensed currents being equal to or greater than the reference current.

8. The LED luminescence apparatus of claim 7, wherein the switch control unit is configured to turn on the first switch in response to the sum of the sensed currents being less than the reference current.

9. The LED luminescence apparatus of claim 7, wherein the switch control unit comprises:

a reference voltage generation unit comprising other operators configured to generate the reference voltage corresponding to the reference current; and
switch control signal generation units configured to:
change the sensed currents to corresponding sensed voltages;
compare each sensed voltage with the reference voltage; and
output respective voltage differences between the sensed voltages and the reference voltage to the respective third terminals of the switches.

10. The LED luminescence apparatus of claim 9, wherein:
each of the switch control signal generation units comprises:
an operator of the operators, the operator comprising a negative feedback loop of the negative feedback loops;
an input impedance unit connected to a (−) terminal of the operator to change the respectively sensed current to the respectively sensed voltage; and
a feedback impedance unit connected between an output terminal and the (−) terminal of the operator; and
the operator is configured to:
compare the respectively sensed voltage input to the (−) terminal with the reference voltage input to a (+) terminal; and
output an input voltage corresponding to a difference between the respectively sensed voltage and the reference voltage to the third terminal of the corresponding switch.

11. The LED luminescence apparatus of claim 1, wherein:
the switch control unit is configured to turn off a first switch, among the switches, in response to a sum of the sensed currents being equal to or greater than a first reference current set in the first switch; and
the switch control unit is configured to turn off a second switch, among the plurality of switches, in response to the sum of the sensed currents being equal to or greater than a second reference current set in the second switch.

12. The LED luminescence apparatus of claim 11, wherein:
the switch control unit is configured to turn on the first switch in response to the sum of the sensed currents being less than the first reference current; and
the switch control unit is configured to turn on the second switch in response to the sum of the sensed currents being less than the second reference current.

13. The LED luminescence apparatus of claim 11, wherein the switch control unit comprises:
a reference voltage generation unit comprising other operators configured to generate reference voltages corresponding to reference currents; and
switch control signal generation units, each switch control generation unit being configured to:
compare a sum of the sensed currents with one of the reference voltages; and
output a voltage difference between the sum of the sensed currents and the one reference voltage to the third terminal of one of the switches.

14. The LED luminescence apparatus of claim 13, wherein:
each of the switch control signal generation units comprises:

a further operator configured to sum the sensed voltages sensed through each of the resistors except for one resistor and output the summed voltage as a first voltage;

an operator of the operators, the operator comprising a negative feedback loop and a (−) terminal connected to an output of the further operator;

an input impedance unit connected to a (−) terminal of the operator to change the respectively sensed current sensed through the one resistor as a second voltage; and a feedback impedance unit connected between an output terminal of the operator and the (−) terminal of the operator; and the operator is configured to:

compare a third voltage with the reference voltage, the third voltage being a sum of the first voltage and the second voltage; and output an input voltage corresponding to a difference between the summed voltage and the reference voltage to the third terminal of the switch connected to the one resistor.

15. A light emitting diode (LED) luminescence apparatus, comprising:

a rectifying unit configured to rectify an alternating current (AC) voltage and generate a rectified voltage;

LEDs connected in series to a first terminal of the rectifying unit;

switches comprising first terminals respectively connected to first electrodes of the LEDs; and a switch control unit configured to:

detect a voltage change amount of the rectified voltage via comparison of the rectified voltage with a reference rectified voltage; and output a control signal for varying a current that flows to the LEDs to a second terminal of the switches in consideration of the voltage change amount, wherein the switch control unit comprises:

operators comprising negative feedback loops, each operator being configured to compare a reference voltage associated with the voltage change amount with a sensed voltage associated with an LED of the LEDs, the sensed voltage being adjusted according to negative feedback of a negative feedback loop of the negative feedback loops.

16. The LED luminescence apparatus of claim 15, wherein the switch control unit is configured to:

sense respective currents through resistors respectively connected to third terminals of the switches;

generate a second reference current via reflection of the voltage change amount in a first reference current;

compare each respectively sensed current with the second reference current; and output respective voltages corresponding to a difference between the sensed currents and the second reference current to respective second terminals of the switches.

17. The LED luminescence apparatus of claim 16, wherein:

the resistors are connected in series with one another;

first terminals of the resistors area respectively connected to third terminals of the switches;

second terminals some of the resistors are respectively connected to second terminals of adjacent resistors; and a second terminal of the resistor connected to the third terminal of the switch coupled to an LED, among the LEDs, most distant from the first terminal of the rectifying unit is connected to a ground terminal.

18. The LED luminescence apparatus of claim 16, wherein, as a value of each of the resistors is changed, a level of the sensed current at a first terminal of each of the resistors is changed.

19. The LED luminescence apparatus of claim 16, wherein the switch control unit is configured to turn off a first switch, among the switches, connected to a first terminal of a first resistor, among the resistors, in response to a sum of the sensed currents being equal to or greater than the second reference current.

20. The LED luminescence apparatus of claim 16, wherein the switch control unit is configured to turn on a first switch, among the switches, connected to a first terminal of a first resistor, among the resistors, in response to a sum of the sensed currents being less than the second reference current.

21. The LED luminescence apparatus of claim 16, wherein the switch control unit comprises:

a voltage change amount detection unit configured to detect the voltage change amount by comparing the rectified voltage with the reference rectified voltage;

a reference voltage generation unit configured to:

generate the second reference current via reflection of the voltage change amount in the first reference current; and generate the reference voltage corresponding to the second reference current; and a switch control signal generation unit configured to:

change the sensed currents to corresponding sensed voltages, the corresponding sensed voltages comprising the sensed voltage;

compare the sensed voltages with the reference voltage; and output respective voltage differences between the sensed voltages and the reference voltage to respective second terminals of the switches.

22. The LED luminescence apparatus of claim 21, wherein:

the reference voltage generation unit is configured to downwardly adjust the second reference current as high as a level that corresponds to the voltage change amount in comparison to the first reference current in response to the voltage change amount having an upward value; and the reference voltage generation unit is configured to upwardly adjust the second reference current as high as a level that corresponds to the voltage change amount in comparison to the first reference current in response to the voltage change amount having a downward value.

23. The LED luminescence apparatus of claim 21, wherein:

the switch control signal generation unit comprises switch control signal generation units configured to output the respective voltage differences to the respective switches;

each of the switch control signal generation units comprises:

another operator comprising a negative feedback loop;

an input impedance unit connected to a (−) terminal of the another operator to change a sensed current to a sensed voltage; and a feedback impedance unit connected between an output terminal and a (−) terminal of an operator of the operators; and the operator is configured to:

compare the sensed voltage input to the (−) terminal with the reference voltage input to a (+) terminal; and output an input voltage corresponding to a difference between the sensed voltage and the reference voltage to the second terminal of the corresponding switch.

24. The LED luminescence apparatus of claim 15, wherein each of the switches is configured to be turned off in response to the voltage input from the switch control unit to the second terminal being less than a threshold voltage of the corresponding switch.

25. The LED luminescence apparatus of claim 15, wherein the switch control unit is configured to control a current falling period of a first switch, among the switches, and a current rising period of a second switch, among the switches, to overlap one another.

26. A light emitting diode (LED) luminescence apparatus, comprising:
a rectifying unit configured to rectify an alternating current (AC) voltage and generate a rectified voltage;
LEDs connected in series to a first terminal of the rectifying unit; and
a current consumption unit comprising a first terminal connected to a connection node of the rectifying unit and the plurality of LEDs to form a current path for the rectified voltage in a period comprising the rectified voltage being less than a forward voltage of one of the LEDs,
wherein the current consumption unit comprises a current consumption switch comprising a first terminal connected to the first terminal of the rectifying unit.

27. The LED luminescence apparatus of claim 26, further comprising a switch control unit configured to:
sense current through resistors respectively connected to first terminals of switches;
compare the sensed current with a reference current; and
output a voltage corresponding to a difference between the sensed current and the reference current to a second terminal of the current consumption switch.

28. The LED luminescence apparatus of claim 27, wherein:
second terminals of the switches are respectively connected to first electrodes of the LEDs;
a second terminal of the current consumption switch is connected to a first terminal of a switch, among the switches, connected to a first LED most adjacent to the rectifying unit; and
the switch control unit is configured to:
sense respective currents through the resistors respectively connected to the first terminals of the switches;
compare each respectively sensed current with the reference current; and
output respective voltages corresponding to respective differences between the sensed currents and the reference current to the current consumption switch and a third terminal of the switches.

29. The LED luminescence apparatus of claim 28, wherein:
the resistors are connected in series with one another;
first terminals of the resistors are respectively connected to the first terminals of the switches;
second terminals of some of the resistors are respectively connected to first terminals of adjacent resistors; and
a second terminal of the resistor connected to the first terminal of the switch coupled to the LED, among the LEDs, most distant from the first terminal of the rectifying unit is connected to a ground terminal.

30. The LED luminescence apparatus of claim 29, wherein, as a value of each of the resistors is changed, a level of the sensed current at a first terminal of each of the resistors is changed.

31. The LED luminescence apparatus of claim 28, wherein:
the switch control unit is configured to turn off the current consumption switch in response to a sum of the sensed currents sensed through the resistors connected to the second terminal of the resistor connected to the current consumption switch among the resistors being equal to or greater than the reference current; and
the switch control unit is configured to turn on the current consumption switch in response to the sum of the sensed currents sensed through the resistors connected to the second terminal of the resistor connected to the current consumption switch among the resistors being less than the reference current.

32. The LED luminescence apparatus of claim 28, wherein:
the switch control unit is configured to turn off a first switch, among the switches, connected to a first terminal of a first resistor, among the resistors, in response to a sum of the sensed currents sensed through the resistors connected to the second terminal of the first resistor being equal to or greater than the reference current.

33. The LED luminescence apparatus of claim 28, wherein:
the switch control unit is configured to turn on a first switch, among the switches, connected to a first terminal of a first resistor, among the resistors, in response to a sum of the sensed currents sensed through the resistors connected to the second terminal of the first resistor being less than the reference current.

34. The LED luminescence apparatus of claim 28, wherein the switch control unit comprises:
a reference voltage generation unit configured to generate a reference voltage corresponding to the reference current; and
a switch control signal generation unit configured to:
change the sensed currents sensed at the first terminals of the resistors to corresponding sensed voltages;
compare each respectively sensed voltage with the reference voltage; and
output respective voltages that correspond to respective differences between the sensed voltages and the reference voltage to the current consumption switch and the switches.

35. The LED luminescence apparatus of claim 34, wherein:
the switch control signal generation unit comprises switch control signal generation units configured to output the respective voltage differences to the current consumption switch and the switches;
each of the switch control signal generation units comprises:
a first operator comprising a negative feedback loop;
an input impedance unit connected to a (−) terminal of the first operator to change the sensed current to the sensed voltage; and
a feedback impedance unit connected between an output terminal and a (−) terminal of a second operator; and
the second operator is configured to:
compare the sensed voltage input to the (−) terminal with the reference voltage input to a (+) terminal; and output an input voltage corresponding to the difference between the sensed voltage and the reference voltage to the third terminal of the corresponding switch.

36. The LED luminescence apparatus of claim 28, wherein each of the switches is configured to be turned off in response to the voltage input from the switch control unit to the second terminal being less than a threshold voltage of the corresponding switch.

37. The LED luminescence apparatus of claim 28, wherein the switch control unit is configured to control a current falling period of a first switch, among the switches, and a current rising period of a second switch, among the switches, to overlap one another.

* * * * *